(12) United States Patent
Neave

(10) Patent No.: US 9,182,511 B2
(45) Date of Patent: Nov. 10, 2015

(54) SYSTEM AND METHOD FOR REPRODUCIBLY EXTRACTING CONSISTENT HORIZONS FROM SEISMIC IMAGES

(71) Applicant: Drilling Info, Inc., Austin, TX (US)

(72) Inventor: John Neave, Littleton, CO (US)

(73) Assignee: Drilling Info, Inc., Austin, TX (US)

( * ) Notice: Subject to any disclaimer, the term of this patent is extended or adjusted under 35 U.S.C. 154(b) by 0 days.

(21) Appl. No.: 14/071,563

(22) Filed: Nov. 4, 2013

(65) Prior Publication Data

US 2014/0140580 A1    May 22, 2014

Related U.S. Application Data

(60) Provisional application No. 61/722,212, filed on Nov. 4, 2012.

(51) Int. Cl.
| | |
|---|---|
| *G06K 9/00* | (2006.01) |
| *G01V 1/30* | (2006.01) |
| *G01V 1/34* | (2006.01) |
| *G06T 7/00* | (2006.01) |
| *G01V 1/00* | (2006.01) |

(52) U.S. Cl.
CPC .............. *G01V 1/301* (2013.01); *G01V 1/345* (2013.01); *G06T 7/0085* (2013.01); *G06T 7/0097* (2013.01); *G01V 2210/643* (2013.01)

(58) Field of Classification Search
CPC .................................. G01V 1/00; G06K 9/00
USPC ............................ 382/109; 702/10, 13, 16, 18
See application file for complete search history.

(56) References Cited

U.S. PATENT DOCUMENTS

| | | | |
|---|---|---|---|
| 5,056,066 A | 10/1991 | Howard | |
| 5,835,882 A | 11/1998 | Vienot et al. | |
| 6,223,126 B1 * | 4/2001 | Neff et al. | 702/16 |
| 7,054,753 B1 | 5/2006 | Williams et al. | |
| 8,265,876 B1 * | 9/2012 | Yu et al. | 702/16 |
| 2004/0015296 A1 * | 1/2004 | Causse et al. | 702/14 |
| 2004/0220790 A1 | 11/2004 | Cullick et al. | |
| 2006/0052937 A1 | 3/2006 | Zoraster et al. | |
| 2009/0043507 A1 | 2/2009 | Dommisse et al. | |
| 2009/0125288 A1 | 5/2009 | Main et al. | |
| 2010/0125349 A1 | 5/2010 | Abasov et al. | |
| 2010/0214870 A1 | 8/2010 | Pepper et al. | |
| 2011/0002194 A1 | 1/2011 | Imhof et al. | |
| 2011/0011595 A1 | 1/2011 | Huang et al. | |
| 2011/0042098 A1 | 2/2011 | Imhof | |
| 2011/0115787 A1 | 5/2011 | Kadlec | |
| 2011/0213577 A1 | 9/2011 | Mousavi et al. | |
| 2011/0313743 A1 | 12/2011 | Oury et al. | |
| 2012/0253770 A1 | 10/2012 | Stern et al. | |
| 2013/0262052 A1 * | 10/2013 | Mallet et al. | 703/2 |

OTHER PUBLICATIONS

PCT International Search Report of PCT/US13/68349; dated Jan. 30, 2014 (3 pgs.).

(Continued)

*Primary Examiner* — Abolfazl Tabatabai
(74) *Attorney, Agent, or Firm* — DLA Piper LLP (US)

(57) ABSTRACT

A system and method is provided for analyst to rapidly and accurately identify and model subsurface geologic horizons, which are bounding surfaces of rock layers, by extracting surfaces from two-dimensional and three-dimensional seismic data.

18 Claims, 29 Drawing Sheets

(56) References Cited

OTHER PUBLICATIONS

PCT Written Opinion of PCT/US13/68349; dated Jan. 30, 2014 (5 pgs.).
Jeong, et al., "A Fast Iterative Method for Eikonal Equations," Siam J. Sci. Comput., vol. 30, No. 5, pp. 2512-2534, 2008 Society for Indistrial and Applied Mathematics.
E. W. Dijkstra, "A Note on Two Problems in Connexion With Graphs," Numerische Mathematik 1, pp. 269-271, 1959.
Hollt, et al., "Interactive Seismic Interpretation With Piecewise Global Energy Minimization," IEEE Pacific Visualization Symposium, pp. 59-66, 2011.
PCT International Search Report of PCT/US13/70838; dated Apr. 9, 2014; (3 pgs.).
PCT Written Opinion of the International Searching Authority of PCT/US13/70838; dated Apr. 9, 2014; (5 pgs.).
PCT International Search Report of PCT/US13/68348; dated Apr. 29, 2014; (3 pgs.).
PCT Written Opinion of the International Searching Authority of PCT/US13/68348; dated Apr. 29, 2014; (4 pgs.).
PCT International Search Report of PCT/US14/34546; dated Sep. 22, 2014; (3 pgs.).
PCT Written Opinion of the International Searching Authority of PCT/US14/34546; dated Sep. 22, 2014; (8 pgs.).
Coleou, et al.; "Unsupervised Seismic Facies Classification: A Review and Comparison of Techniques and Implementation" dated Oct. 2003; pp. 942-953; (7 pgs.).
Andersen, et al.; "Seismic Waveform Classification: Techniques and Benefits," Dated Mar. 2004; pp. 26-29; (4 pgs.).
Castro de Matos, et al. "Unsupervised Seismic Facies Analysis Using Wavelet Transform and Self-Organizing Maps" dated Dec. 13, 2006; vol. 72, No. 1, pp. P9-P21, 19 Figs.; (13 pgs.).
Roy, et al.; "Automatic Seismic Facies Classification with Kohonen Self Organizing Maps—a Tutorial" dated Dec. 2010; pp. 6-14; (9 pgs.).
Diersen et al.; "Classification of Seismic Windows Using Artificial Neural Networks" dated 2011; pp. 1-10; (10 pgs.).
Watson, A. Ted, et al. NMR characterizations of properties of heterogeneous media. Research Report, Final Report. US Department of Energy, DOE Award No. DE-AC26-99BC15202, Texas A&M University, Jan. 2005., pp. 1-151; (151 pgs.).
Vander Valk, P.A., and P. Yang. "Investigation of key parameters in SAGD wellbore design and operation." Journal of Canadian Petroleum Technology 46.6 Jun. 2007: 49-56; (8 pgs.).
Hintze, J.L. (2007), NCSS Data Analysis User's Guide III, Regression and Curve Fitting. NCSS 2007. Retrieved from http://ncss.wpengine.netdna-cdn.com/wp-content/uploads/2012/09/NCS-SUG3.pdf, pp. 1-653; (653 pgs.).
Wikipedia. Wikipedia, Overfitting. Revision from Aug. 23, 2012. pp. 1-3. Retrieved from http://en.wikipedia.org/w/index.php?title=Overfitting&oldid=508784472; (3 pgs.).
Ouenes, Ahmed, et al. "Practical use of neural networks in tight gas fractured reservoirs: application to the San Juan Basin." Paper SPE 39968 (1998); (8 pgs.).
Can, Buynamin. Probabilistic performance forecasting for unconventional reservoirs with stretched-exponential model. Diss. Texas A&M University, 2001; (74 pgs.).

* cited by examiner

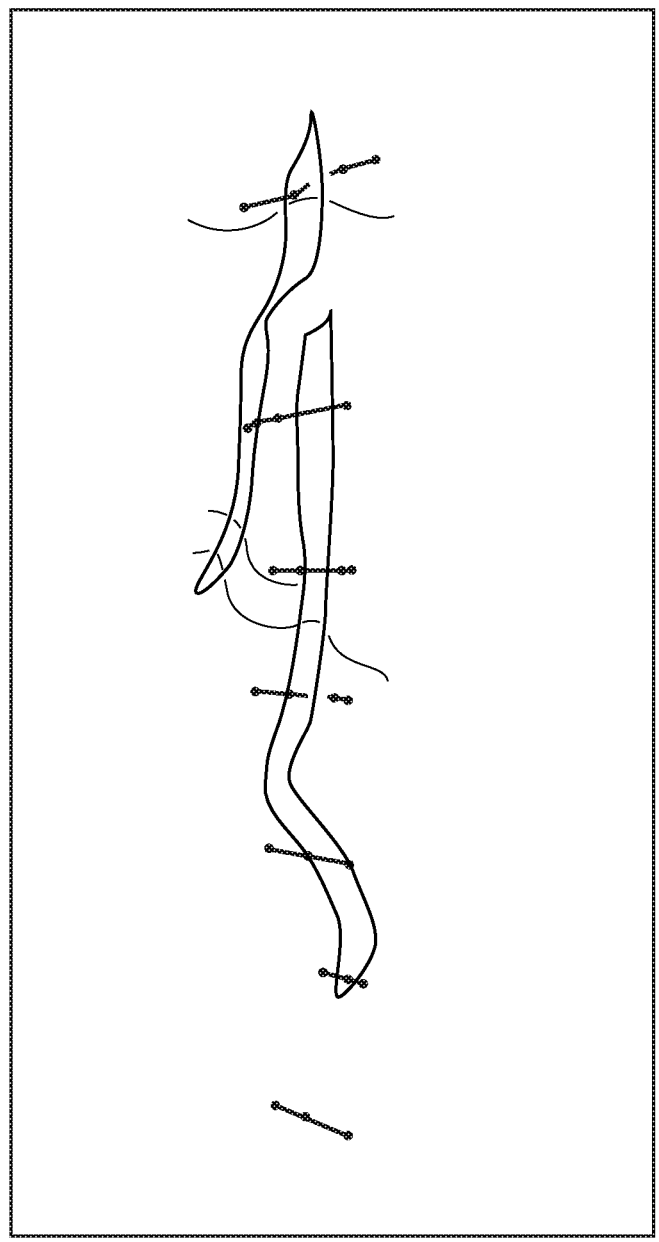
FIG. 10C1

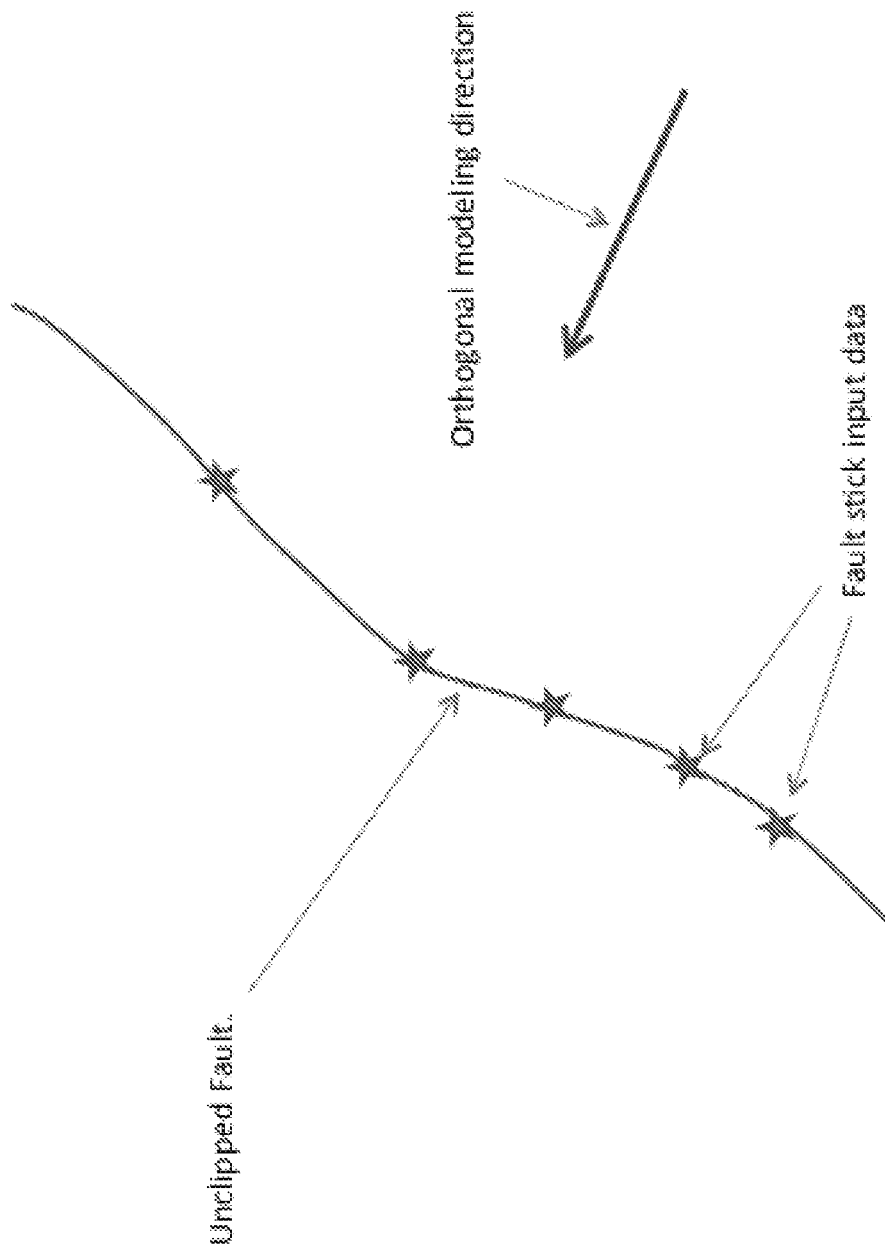
FIG. 10C2

SYSTEM AND METHOD FOR REPRODUCIBLY EXTRACTING CONSISTENT HORIZONS FROM SEISMIC IMAGES

PRIORITY CLAIMS/RELATED APPLICATIONS

This application claims priority to and the benefit of, under 35 USC 119(e) and 120 to U.S. Provisional Patent Application Ser. No. 61/722,212 filed on Nov. 4, 2012 and entitled "Process for Reproducibly Extracting Consistent Horizons from Seismic Images", the entirety of which is incorporated herein by reference.

FIELD

This invention is in the field of seismic prospecting, and is more specifically directed to the semi-automatic, or guided, extraction of features indicative of geologic horizons in seismic images. The system and method may be useful for analysts tasked with mapping subsurface rock formations from seismic images.

BACKGROUND

Horizons and faults are fundamental geologic features that describe the geology, geometry and topology of the subsurface of the earth, which is imaged by the seismic method. Horizons are bounding surfaces of rock layers and are usually formed during depositional or erosional events. Horizons indicate generally vertical changes in rock material properties and bound rock volumes of economic interest. Faults compartmentalize the subsurface and are indicators of deformation over geologic time. Faults can act as permeable conduits or impermeable seals affecting the flow of subsurface fluids and gases and can also be drilling hazards. Hence, rapid and accurate mapping of geologic horizons and faults has high economic and safety value.

Roughly since Howard, in U.S. Pat. No. 5,056,066, introduced the idea of automatically tracking horizons in 3-D seismic data, a variety of methods for automatic and manual horizon extraction have been introduced. An article titled "Interactive seismic interpretation with piecewise global energy minimization" by T. Hollt, J. Beyer, F. Gschwantner, P. Muigg, H. Doleisch, G. Heinemann, M. Hadwiger in IEEE Pacific Visualization Symposium, pages 59-66, 2011 provides a recent survey. With few exceptions, horizon tracking has been posed as a local surface extension problem in which points exterior to a surface edge are individually evaluated for consistency with points on the surface edge and, if the exterior and edge points are similar enough by some measure, the exterior points are incorporated into the surface as new edge points. Thus the surface can grow from one or more user-selected seed points selected from examination of the seismic data, stopping when the exterior points are too dissimilar from the edge points to permit further growth or when the boundaries of the data are reached.

Quite often, the seismic image is sufficiently contaminated by noise that automatic horizon trackers either do not propagate the surface as far as is desirable (insufficient results) or, usually worse, propagate the surface in directions that do not correspond to actual geologic horizons (incorrect results). In the first case, the analyst typically inserts additional seed points or lowers the similarity threshold to promote surface propagation. In the second case, the analyst may either raise the similarity threshold or manually edit the surface to remove undesirable portions of the extracted surface. The combination of a difficult-to-control automatic extraction process with subsequent manual editing and further automatic extraction can lead to results that are highly dependent on the sequence of tedious analyst actions and are thus generally irreproducible.

For typical noisy seismic images, a mixture of manual and automated interpretation is required. This invention is a semi-automated computer-based process that reduces the time consuming nature of horizon interpretation, while simultaneously increasing the fidelity and reproducibility of the extracted horizon surfaces and at the same time allowing an analyst to manually interpret and modify the automatically extracted surfaces in regions of poor image quality.

It is desirable to provide a process that significantly reduces the time required for interpretation, while increasing the accuracy and reproducibility of the extracted horizon surfaces and it is to this end that the disclosure is directed.

BRIEF DESCRIPTION OF THE DRAWINGS

FIGS. 10A-10H are various screen shots generated according to fault thickness workflow described herein.

DETAILED DESCRIPTION OF ONE OR MORE EMBODIMENTS

Figure 1:
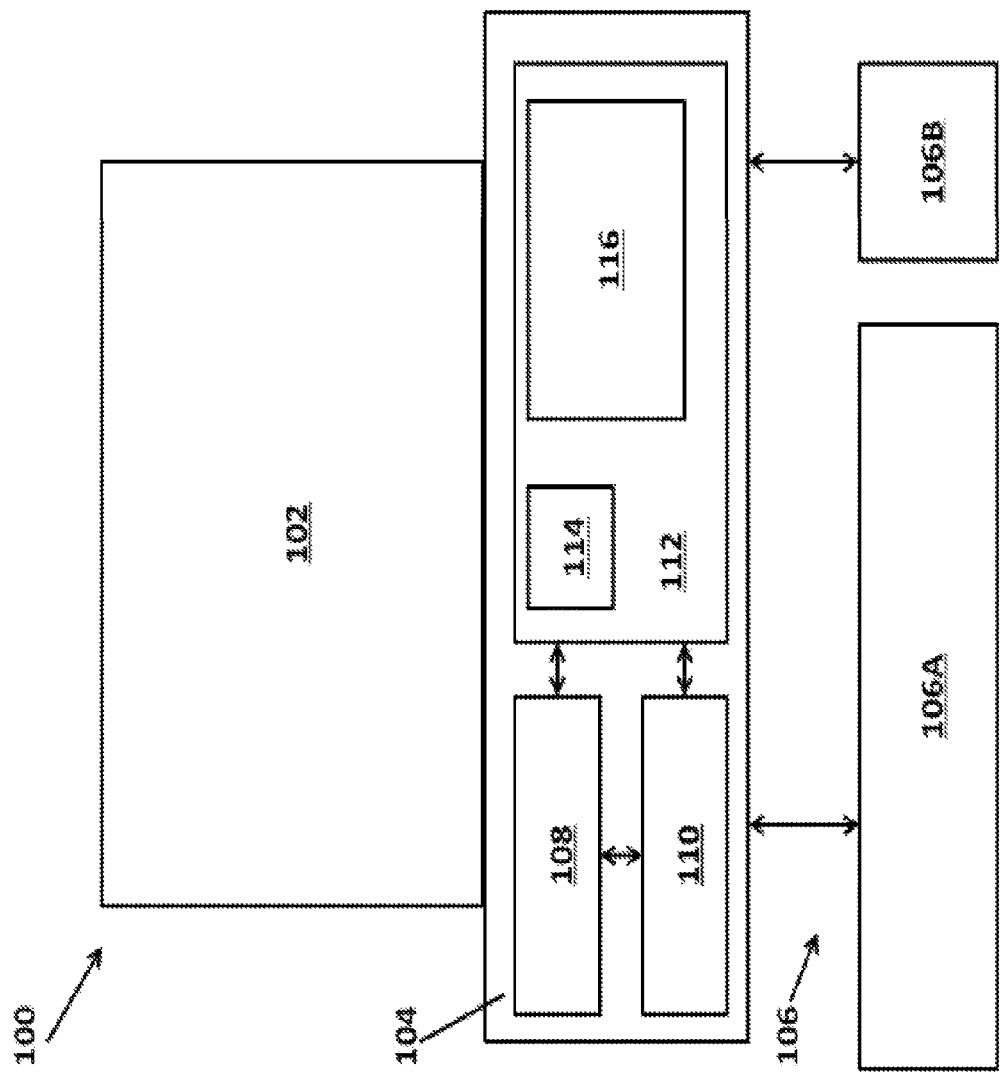
FIG. 1 illustrates an implementation of a horizon extracting system on a computer system.

The disclosure is particularly applicable to a computer based system for extracting horizons for energy discovery and it is in this context that the disclosure will be described. It will be appreciated, however, that the system and method has greater utility since it may be implemented in other computer systems not specifically described below that are known in the art, may be implemented in purely hardware systems and/or the system and method may be implemented in different manners than those described below that are also within the scope of the disclosure.

The system and method of guided consistent horizon interpretation, as described in this disclosure, significantly reduces the time required for interpretation, while increasing the accuracy and reproducibility of the extracted horizon surfaces. Because this method recasts the problem as a relaxation problem, rather than as an edge extension problem in typical systems, the extraction of the horizon may be solved efficiently using methods similar to those used to solve shortest path or eikonal problems. This method retains the speed of propagator methods and the flexibility of manual interpretation when necessary, but does so in a way that the resulting surfaces are unique, deterministic, internally consistent and reproducible.

A feature of the system and method is an incorporation of a natural monotonic "geodesic distance" measure between candidate elements of the extracted surface. In this context, a natural distance is a monotonic function, which we refer to as "confidence", which decreases with distance from selected seed points. In one embodiment of the system and method, the confidence of any point on the extracted surface may be determined: $C_i = C_{i-1} x_{i,i-1}$, where i indicates a point on the surface, i−1 indicates the point's antecedent during horizon extraction, and $x_{i,i-1}$ is the maximum of the normalized cross-correlation of windows of the seismic traces at locations i and i−1, and zero. It is typical to assign an initial value of 1 to analyst-selected seed points. Since the clipped normalized cross-correlation function has values in the range [0,1], the confidence is guaranteed to decrease monotonically (although not strictly so) as the surface grows away from the seed points. One can think of the confidence as the local velocity with which the horizon grows away from the seed points. The higher the confidence, the faster the horizon will grow.

In the system and method, any monotonic function can be used for the local "distance" metric. Using such a monotonic "distance" measure allows us to recast the horizon propagation problem so that it can be solved using methods similar to shortest path algorithms described in "A note on two problems in connexion with graphs" by E. Dijkstra. *Numerische Mathematik*, 1(1): pp. 269-271 (1959) (which is incorporated herein by reference) or relaxation methods similar to those used to efficiently solve large eikonal problems as disclosed in "A fast iterative method for eikonal equations" by W. Jeong, R. Whitaker. *SIAM J. Sci. Comput.*, 30(5), pp. 2512-2534 (2007) (which is incorporated herein by reference.) Such solution methods are efficient, can be generalized for different "distance" metrics and, importantly, guarantee a unique solution which maximizes the global confidence of the surface. This is in severe contrast to existing methods for horizon extraction, which rely only on local measures of signal similarity to guide the extraction process. Because of this difference, existing horizon extraction methods are not deterministic or reproducible—the results depend on the order of insertion of the seeds and possibly barriers used to edit the surface—while the results of this invention are indeed deterministic and reproducible.

The deterministic nature of the results and the introduction of a monotonic "distance" or "confidence" measure produces a major novelty of the method: an analyst can specify the confidence value at selected positions on an extracted horizon to naturally influence the subsequent computed horizon. In typical usage an analyst will recognize portions of an extracted horizon that are correct and other portions that are incorrect. Rather than tediously editing the extracted surface to determining precisely where the extraction process went awry, the analyst can simply increase the confidence in the correct portions, which will guide the newly extracted surface to conform more closely to the desired results.

Another feature of the system and method is that barriers such as faults, salt bodies, or any other analyst-specified curve or surface can be incorporated into the solution as regions of extremely low confidence, which will prevent the horizon from propagating through them—although, advantageously, the horizon can naturally propagate around such barriers. Another feature of the system and method is the ability to specify a fault "thickness" rather than a simple zero-thickness surface and treat the volume contained in the "thick fault" as a barrier to horizon propagation. Seismic images near to fault zones are commonly noisy. The thick faults prevent the horizon tracker from trying to propagate the surface into those noisy areas.

The system and method may also include a process of combining a volumetric fault block model with horizon tracking (by nearly any method) to allow the creation of multi-valued horizons (commonly referred to as "multi-z" in the oil and gas industry). A fault block model is a three-dimensional complete and non-overlapping partitioning of space. Fault block bounding surfaces are either true fault surfaces or other mathematically convenient surfaces. In this system, horizons are tracked within each fault block using well-known techniques, resulting in single-valued horizons within each fault block. The system allows the horizon tracker to propagate unimpeded across the non-fault mathematically convenient bounding surfaces (from one fault block to another) while disallowing propagation across true fault bounding surfaces. The aggregate horizons, formed by the combination of the horizon fragments within each fault block, may indeed be multi-valued. Multi-valued horizons are important and common in compressional geologic regions that contain reverse faults.

The system and method efficiently produces improved and consistent models of subsurface geologic horizons, and does so with greater fidelity, speed and reproducibility than can be achieved by manual interpretation, and with greater flexibility and analyst supervision than can be achieved by fully automatic methods of horizon extraction. Unlike other horizon extraction methods, the result is independent of the order of automatic or manual interpretation actions such as adding seed points, inserting faults or other barriers that limit the extent of the extracted horizon. The system may also translate analyst judgment into an imposed confidence setting along portions of the horizon which makes the process of horizon interpretation much faster and more natural than previous methods.

The combination of a space-filling fault block model with a single-valued horizon tracker permits rapid horizon extraction in complex geologic regions, which is especially unique and valuable in regions that exhibit reverse faults and repeated geologic sections. The system and method also intelligently extracts horizons from different seed points. Thus, when regions from different seeds collide with one another, the solution with the shortest path (as previously described) will take precedences. In addition, a node between two seeds will be owned by the seed with the shortest path.

The horizon tracked by the process can be influenced by analyst-specified regions of high confidence, and by setting a threshold on minimum confidence, below which the horizon tracker will not propagate. These high confidence points can be additional seed points selected directly on the seismic data or may simply be a point selected directly on the previously extracted horizon—in essence telling the algorithm that the analyst has high confidence in that extracted point. The horizon tracked by the process may also be influenced by faults or other analyst-specified barrier surfaces or regions of extremely low confidence, beyond which the horizon tracker will not propagate. Fault thicknesses can be assigned to preclude horizon propagation within the volume contained by the "thick fault". The horizon tracked by the process can propagate across non-fault mathematical fault block bounding surfaces and can be blocked by true fault block bounding surfaces in such a way to create a multi-valued horizon comprised of single-valued horizon segments within each fault block.

FIG. 1 illustrates an implementation of a horizon extracting system on a computer system 100. In this implementation of the horizon extracting system, the system may have a display 102, a chassis 104 and one or more input/output devices 106, such as for example, a keyboard 106A and a mouse/pointing device 106B as shown in FIG. 1. The computer system shown in FIG. 1 may be a personal computer, a tablet computer, a laptop computer, a smartphone device, a terminal and the like that can host the horizon extracting system. The computer system may further comprise at least one processor 108, a persistent storage component 110, such as flash memory, a hard disk drive and the like and memory 112, such as DRAM or SRAM. The memory may store an operating system 114 and a horizon extracting component 116 wherein the operating system 114 and the horizon extracting component 116 may be executed by the at least one processor 108 to implement the horizon extracting system. In this implementation, the horizon extracting component 116 may be a plurality of lines of computer code that are executed by the at least one processor and implement the operations of the horizon extracting system described below. In this implementation, the horizon extracting component 116 processes data and displays results on the computer system.

Figure 2:
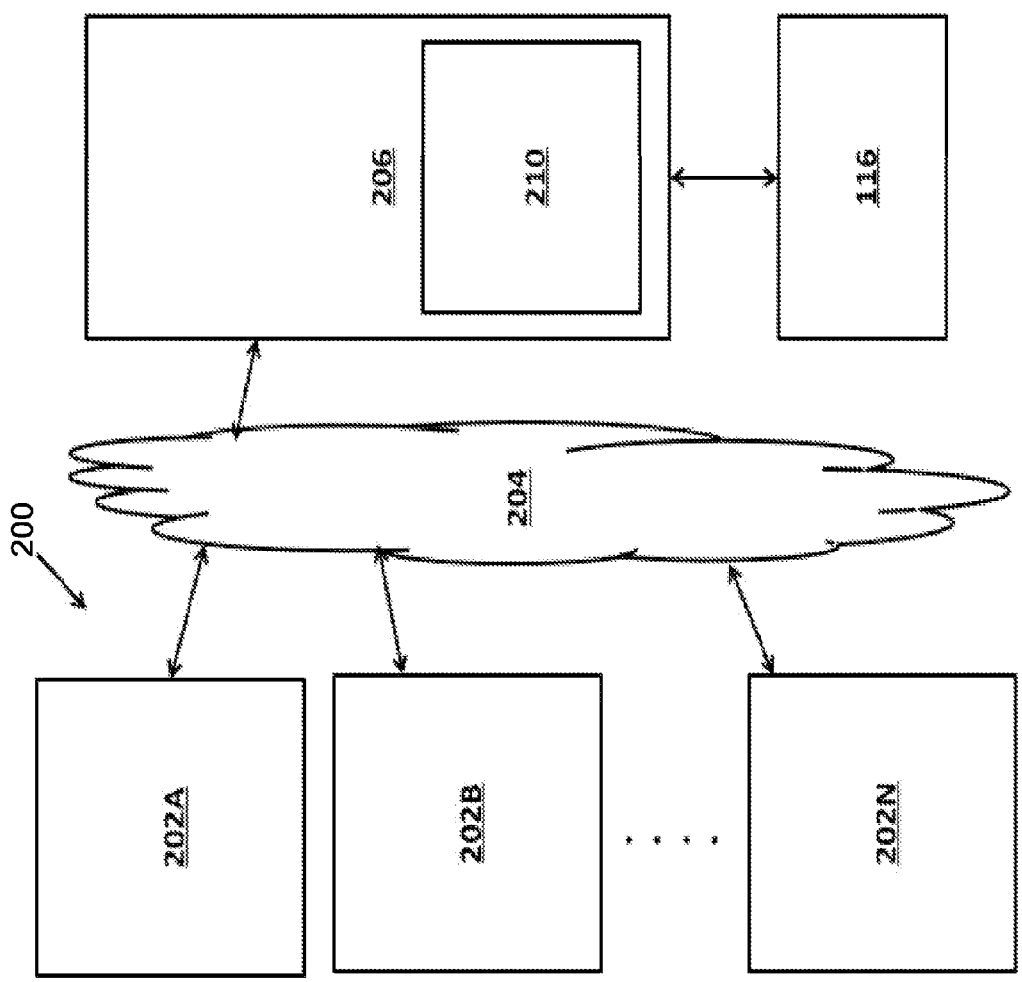
FIG. 2 illustrates an implementation of a horizon extracting system on another computer system.

FIG. 2 illustrates an implementation of a horizon extracting system 200 on another computer system. In this implementation, the horizon extracting system 200 is implemented using a client server architecture as shown in FIG. 2, but may also be implemented using a peer to peer architecture, using a software as a service model, using a cloud based computing architecture and the like. In this implementation, the system may have one or more computing devices 202 that connect to and communicate over a communications path 204 with a backend system 206 that may house the horizon extracting component 116. Each computing device may be a smartphone device, a personal computer, a tablet computer, etc. that has at least a processor, persistent storage, memory and connectivity circuits that allow the computing device to connect to and communicate over the communications path 204. Each computing device may execute a browser application or an application installed on the computing device that facilitates the interaction with the horizon extracting component 116. The communications path 204 may be a wired or wireless link, network, computer network, cellular data network and the like. The backend system 206 may be one or more computing resources that each have at least one processor, persistent storage and memory. For example, each computing resource may be a server computer or a cloud computing component. In this implementation, the processing of the data by the horizon extracting component 116 may occur at/within the backend component 206 and then the results may be displayed on a particular computing device 202.

Both the systems in FIGS. 1 and 2 may also have a fault block analyzer component that is adjacent to the horizon extracting component 116 (or incorporated into the horizon extracting component 116) that performs the fault block analysis process that is described below with reference to FIGS. 6-10.

In other implementations, the horizon extracting system may be implemented in hardware that has one or more functional modules wherein the module may be logic embodied in hardware or firmware, or to a collection of software instructions, possibly having entry and exit points, written in a programming language, such as Java. A software module may be compiled and linked into an executable program, or installed as a dynamic link library, or may be written in an interpretive language such as Python. It will be appreciated that software modules may be callable from other software modules, and/or may be invoked in response to detected events or interrupts. Software instructions may be imbedded in firmware, such as EPROM. It will be further appreciated that hardware modules may be comprised of connected logic units, such as gates and flip-flops, and/or may be comprised of programmable units, such as programmable gate arrays. The modules described in this disclosure are preferably implemented as software modules, but could be implemented in hardware or firmware. Further, the process described below also can be implemented in less common computer system or devices, such as field programmable gate arrays (FPGAs) or graphics processing units (GPUs), in addition to being implemented on central processing units (CPUs.)

In addition, other embodiments of the system and method may be implemented as logical steps in one or more computer systems that include one or more processors for executing modules and/or instructions of horizon interpretation application. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

Figure 3A:
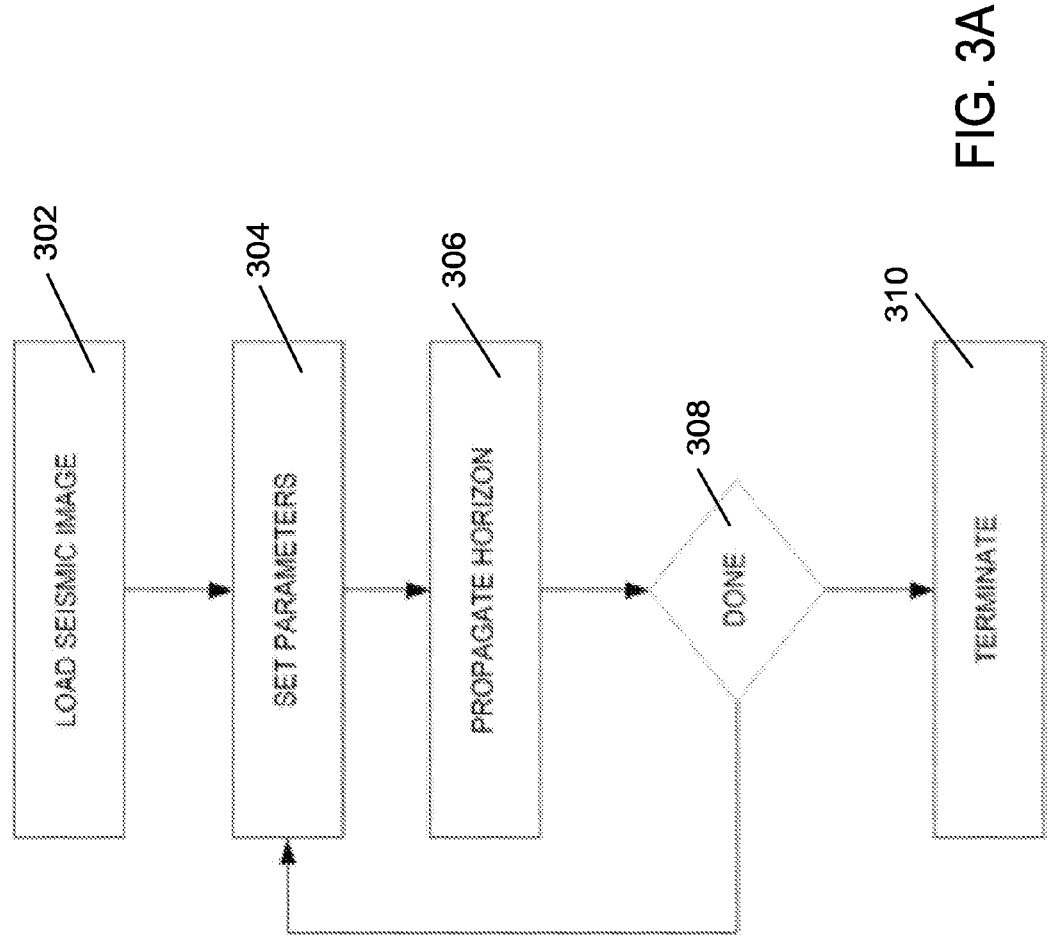
FIG. 3A depicts a method for implementing a horizon interpretation system according to aspects of the disclosure.

FIG. 3A depicts a method 300 for implementing a horizon interpretation system according to aspects of the disclosure in which each horizon may be interpreted using the process set forth in FIG. 3A and described below. The process shown in FIG. 3A may be carried out by the systems shown in FIGS. 1 and 2. In the method, a seismic image is created or loaded and displayed 302. Once the seismic image is loaded, one or more parameters may be set 304. The setting of the parameters may include selecting one or more seed points in the seismic image, from which horizon extraction will begin. In addition, a confidence of the seed points also may be set typically, but not necessarily, to one. During the parameter setting, the system may optionally create or load and display a fault-enhanced seismic image and set a fault threshold value, such that locations with fault values higher than the threshold will have low confidence, typically but not necessarily zero. During the parameter setting, the system may optionally create or load interpreted fault surfaces and fault thicknesses, within which the confidence will have low values, typically but not necessarily zero. In addition, the system may optionally create or load a fault block model (described in more detail below) and set the confidence along block boundaries to zero wherever the block boundary is a fault.

When the parameters are set, the system may propagate the horizon 306. During the propagation of the horizon, the system may track the horizon using a global shortest path or similar algorithm, for which the local distance metric between neighboring samples is a monotonic function. There are numerous implementations of image-guided shortest paths algorithms that may be used in the system. For example, "A note on two problems in connexion with graphs" by E. Dijkstra. *Numerische Mathematik*, 1(1): pp. 269-271 (1959) (which is incorporated herein by reference) discloses a process that may be used and fast iterative methods for solving eikonal equations may also be used such as "A fast iterative method for eikonal equations" by W. Jeong, R. Whitaker. *SIAM J. Sci. Comput.*, 30(5), pp. 2512-2534 (2007.) The solution of the eikonal equation is very similar to the solution of the shortest paths problem. Furthermore, other similar algorithms can be easily modified and used with this process.

Using the tracking process, the system may compute a quality measure for each of the neighbors of the samples with the highest confidence. This quality measure should be a monotonically increasing function of similarity between the windowed seismic traces at the evaluation point, such as the normalized cross-correlation function, computed at the lag that maximizes the cross-correlation. In the shortest path algorithm, the cost of connecting two image samples to extend the horizon may depend on the confidence, $C_i = C_{i-1} x_{i,i-1}$, where i indicates a point that may lie on the surface, i−1 indicates the point's antecedent during horizon extraction, and $x_{i,i-1}$ is the maximum of the maximum normalized cross-correlation of windows of the seismic traces at locations i and i−1, and zero. The cross-correlation function may be evaluated at zero lag, but may be modified to incorporate knowledge of horizon dip, which may be estimated either by local analysis of the previously picked part of the horizon or by orientation analysis of the seismic image. In addition, other measures of trace-to-trace similarity may be used instead of normalized cross-correlation. The important point is that the more similar the traces the higher the confidence (and the lower the cost of connection) and vice versa. In the process, if the confidence has previously been set by the analyst, either as seed points or as optional inhibitors as, those confidence values may be kept constant (unchanging throughout the computation).

In the above process, the propagation processes above may be repeated until a satisfactory horizon is produced. Then, processes 302-306 may be optionally repeat for multiple horizons. The above process was described for a three-dimensional implementation of the system and method, but it should be noted that the method can be applied to two-dimensional and higher-dimensional problems in a straightforward and known manner. In addition, although the process is described above using a monotonically decreasing confidence function as the geodesic "distance" measure as an example, the process may also be implemented using any other known monotonic "distance" measure that depends on trace similarity.

Figure 3B:
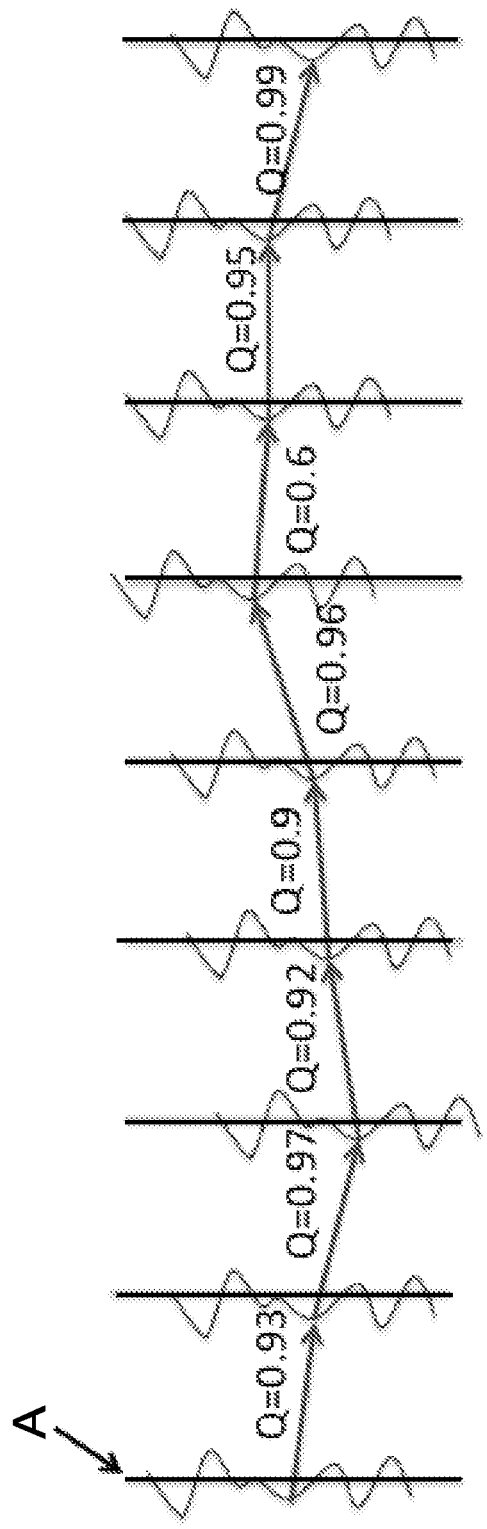
FIG. 3B illustrates an example of the horizon interpretation process using the method in FIG. 3A.

FIG. 3B illustrates an example of the horizon interpretation process using the method in FIG. 3A. As shown in FIG. 3B, a starting point of a horizon trace (point A) is at a seed at which the confidence is 1.0 (e.g., the seed is part of the horizon.) The horizon trace is the paths as shown and the confidence of the horizon trace is an aggregate of the quality factors (Q=0.93 or 0.6 for example) on the optimim path as shown.

Figure 9A:
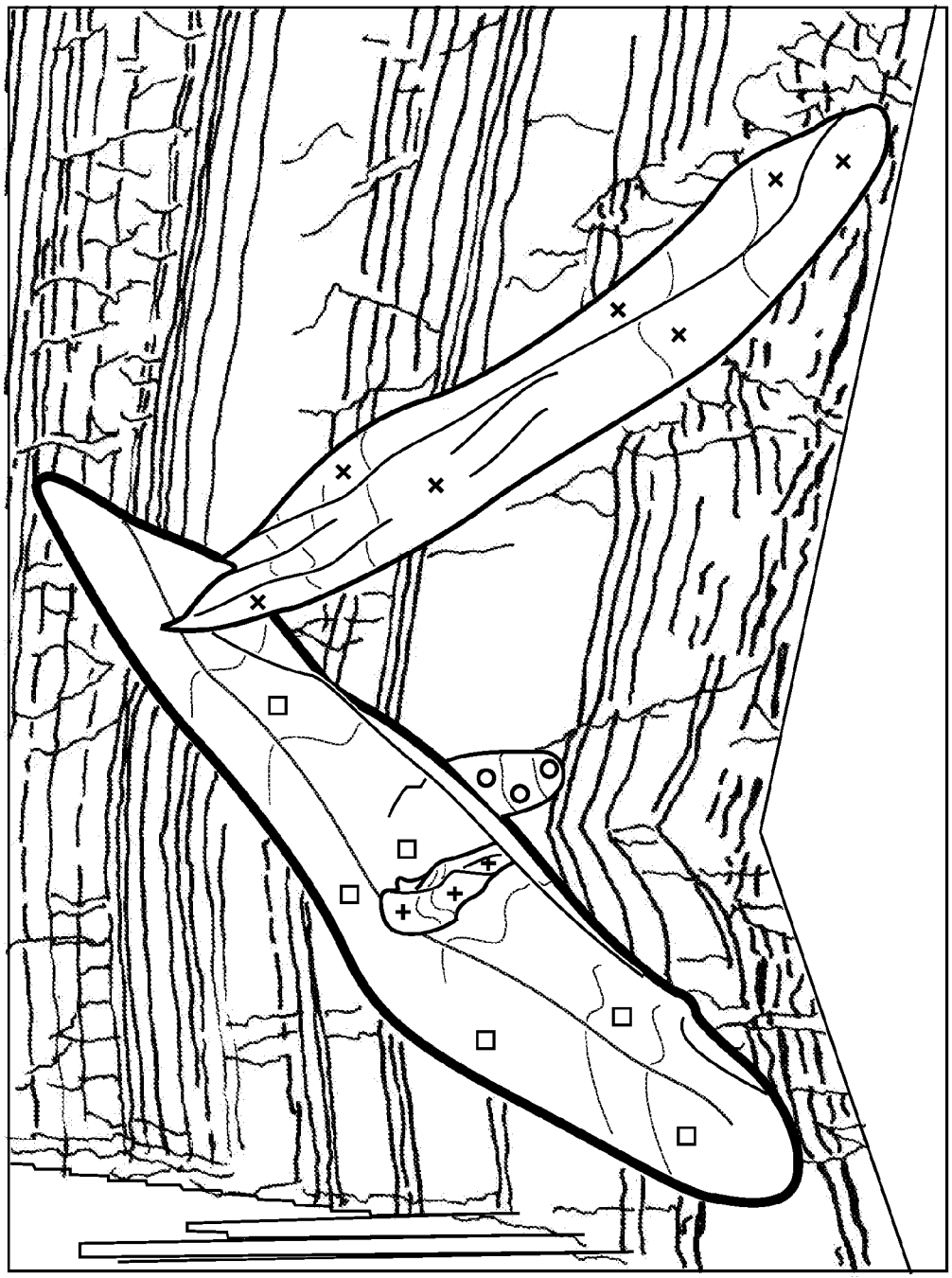
FIGS. 9A-9K are various screen shots generated according to aspects of the horizon interpretation system.
Figure 9B:
Figure 9C:
Figure 9D:
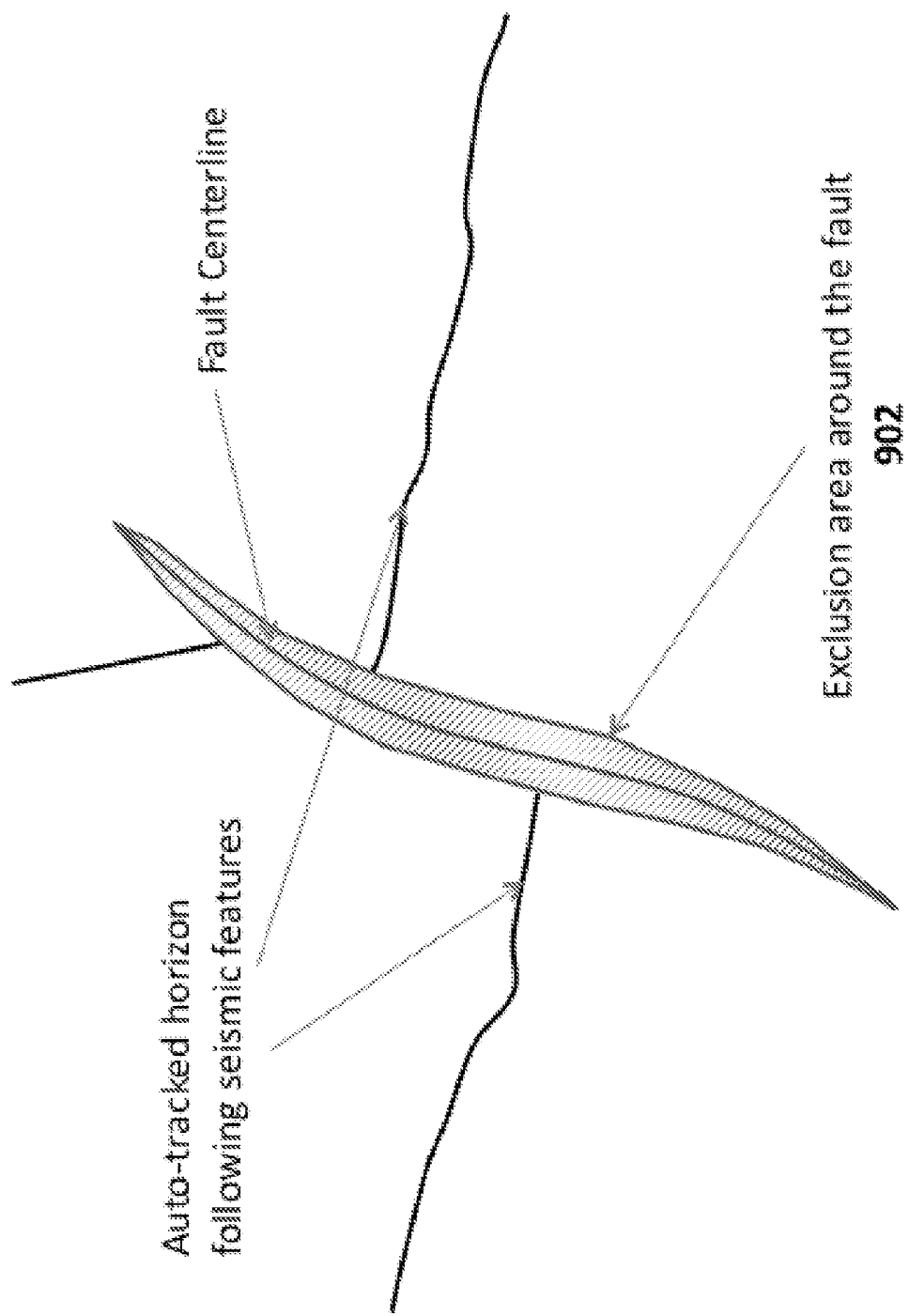

As part of the method shown in FIG. 3A, a user of the system can modify the horizon extracted from the seismic image merely by modifying the confidence of a point or portion of the previously extracted horizon. For example, the analyst may determine that a portion of the extracted horizon is correct, while another portion is incorrect. Rather than removing the bad portion, the user can add a seed in this area in the correct location as shown in FIG. 9G. This will raise the confidence in this area moving the horizon to be consistent with the new seed until it reaches high confidence results from other seeds. This is much quicker and more reproduceable than hand eding parts of the horizon away and re-running an auto tracker in bad areas.

Analyzing Fafult Blocks

Figure 4:
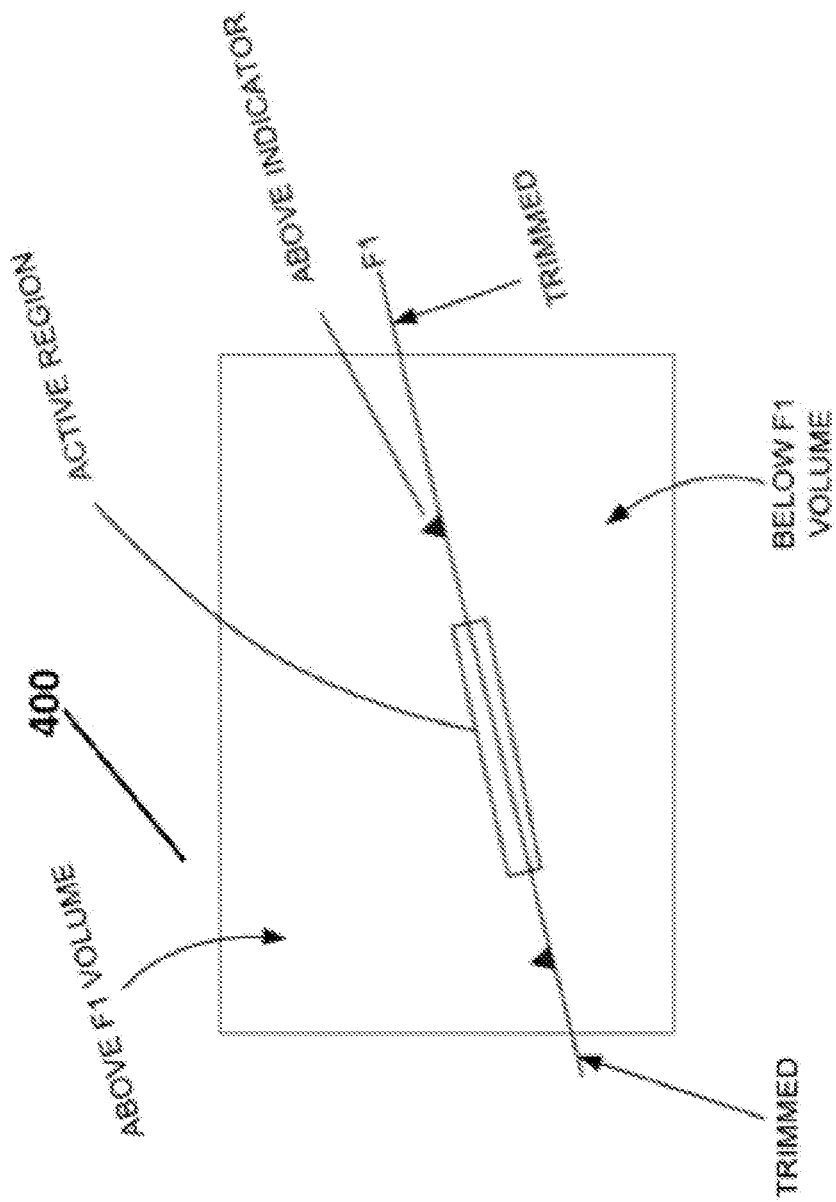
FIGS. 4 and 5 depict exemplary fault blocks analyzed.
Figure 5:
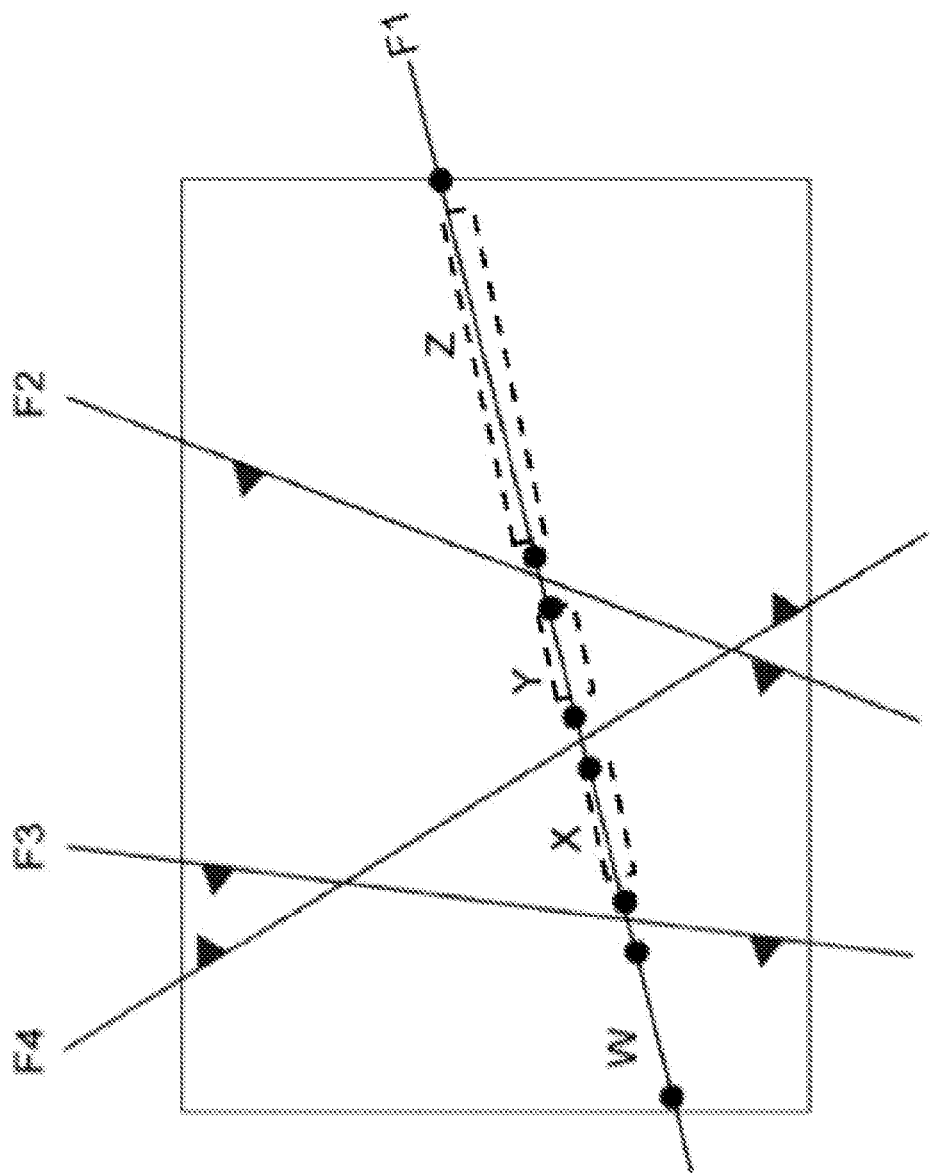
Figure 6:
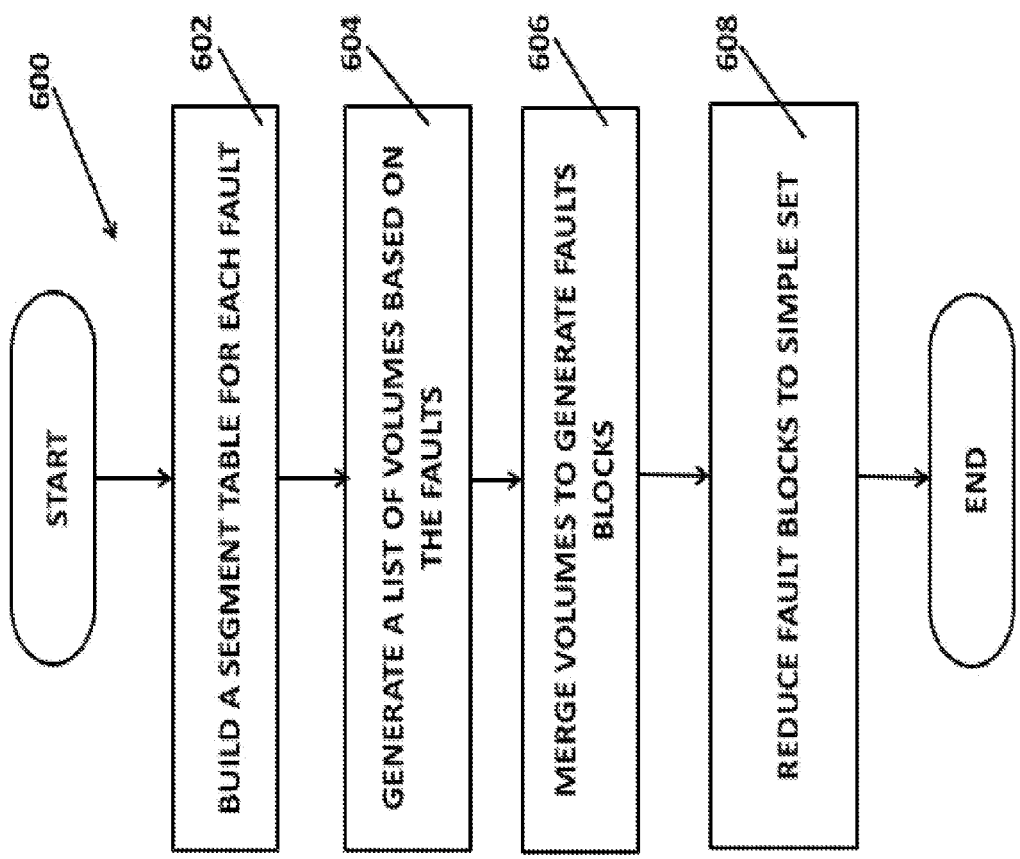
FIG. 6 illustrates a method for determining fault blocks that may be part of the horizon extraction method.

Now an exemplary process for analyzing fault blocks that may be used as part of the horizon extraction process above is described in more detail with reference to FIGS. 4-6. There are many situations where it is useful to compartmentalize a volume of space into regions separated by faults and faults can form barriers so these compartments can be thought of as leaky containers for any fluids held in the geology. These containers are of vital importance in the study of oil and gas flow in a geologic reservoir. Any point in the model must be contained in one and only one fault block container. Thus, FIGS. 4-6 describes an automatic process for defining and generating a set of fault blocks for a given region and set of faults in which each fault block may be defined by a small set of relationships to faults, such as for example Fault block 1 may be above fault A, below fault B etc. and Fault block 2 may be below fault A, below fault B etc. In the process, the generated fault blocks do not overlap and have no gaps.

The process inputs may include:
A region of space of interest.
A set of fault models.
A set of truncation rules between the fault models.

The region of space for the process, in the simplest case, can be a box defined by xmin,xmax,ymin,ymax,zmin and zmax, but more complex shapes for the region of space of interest may also be used.

In a fault, the rock on one side of the fault is moved relative to the rock on the other side. The rock is elastic and this motion can often be localized so that the fault dies out. The required fault model for this process requires the area where the fault is active to be marked but extrapolates the fault surface so that it cuts the region of space into two parts, one above the fault and the other below. In the case of a vertical fault the 'above' and 'below' labels are arbitrary (being to the right side and left side for example) but as long as they are consistently applied the process operates properly.

Figure 7:
FIG. 7 illustrates a user interface showing an example of a set of input faults.

When faults touch the stress which forms one fault can be absorbed by another fault forming a joint and the one fault is truncated on the other fault. This information may be added to the process as a set of truncation rules. For example, these rules may be in form of fault 'A' truncates above fault 'B' which will mean that fault 'A' is only active below fault B. For example, FIG. 7 illustrates an example of a user interface of a computer system that shows the faults (shown in different colors) input into the process. In this example, only the active parts of the faults are shown and truncations can be seen since the faults start and stop.

Steps in the Analyzing Fault Block Process

This process may be implemented in three dimensions. However, the process is explained below in two dimensions for ease of understanding. Once the process has received the inputs as described above, the process may begin by building a segment table for each fault 602. Initially, in this process, each fault may be trimmed against a region of space 400, an example of which is shown in FIG. 4, in which fault, F1, is being trimmed to the region (shown by the box.) Then, each fault may be cut by every other fault in the process. In an example shown in FIG. 5, four faults (F1, F2, F3 and F4) are shown. In the process, F1 may be broken into four segments with each segment has a relationship with the other three faults. For instance, segment 'W' is above F2, Above F3 and below F4. This information can be expressed as a table of relationships where 'A' is above and 'B' is below shown in Table 1.

TABLE 1

| SEGMENT | F2 | F3 | F4 |
|---|---|---|---|
| W | A | A | B |
| X | A | B | B |
| Y | A | B | A |
| Z | B | B | A |

Figure 8:
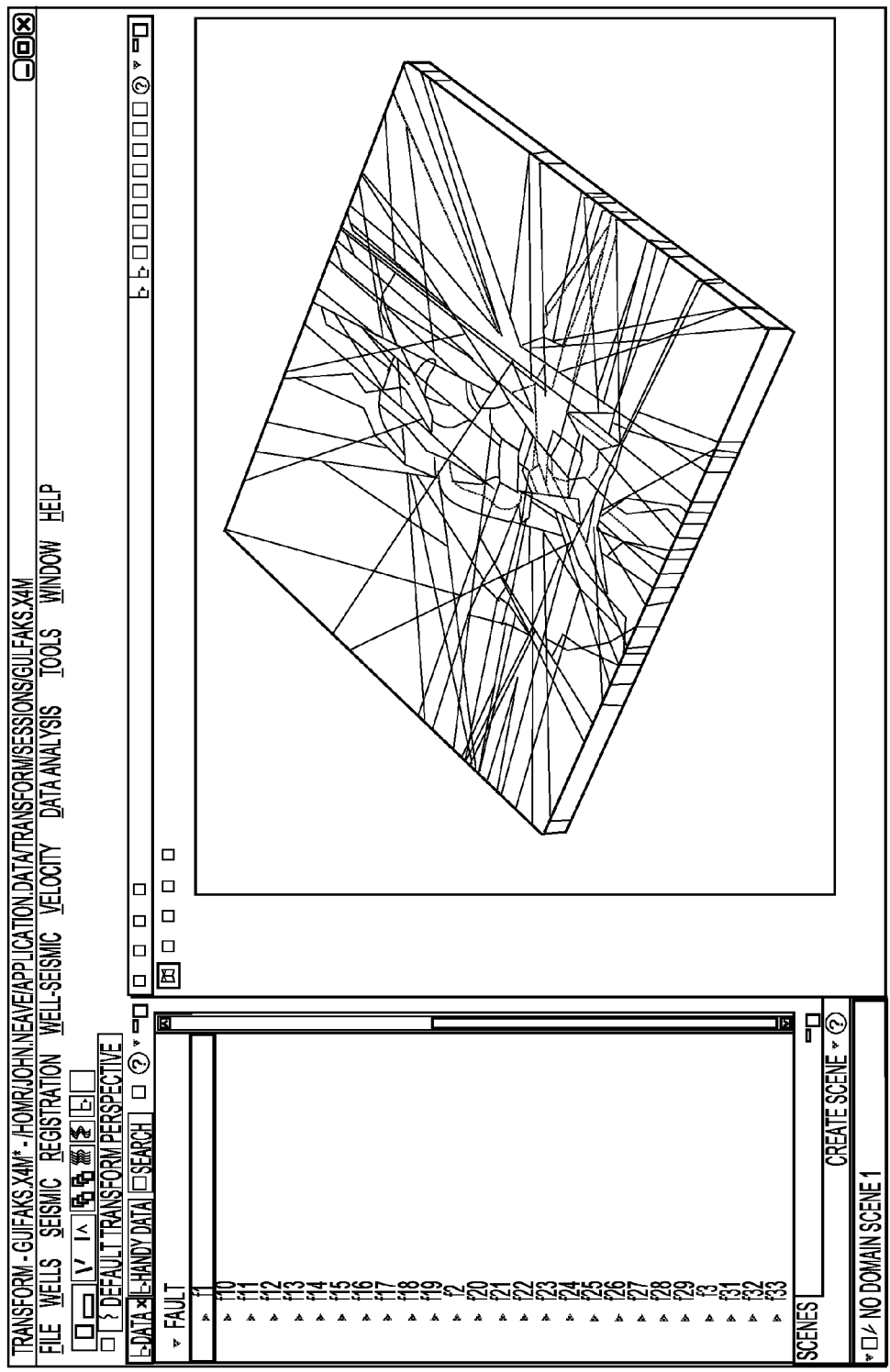
FIG. 8 illustrates a user interface showing an example of segments of a fault.

When this process is carried out in three dimensions, the segments are polygons and the result of this process can be see graphically in FIG. 8. During the process, each segment may or may not contain an active part of the fault. For example, FIG. 5 shows that segments X,Y and Z contain active faulting (as shown by the dotted boxes in FIG. 5.) This information may be added to Table 2 which is more refined version of the segment table.

TABLE 2

| SEGMENT | F2 | F3 | F4 | Active |
|---|---|---|---|---|
| W | A | A | B | N |
| X | A | B | B | Y |
| Y | A | B | A | Y |
| Z | B | B | A | Y |

As part of the process, the truncation information now may be added. For example, if the process has the rules that 'F' is truncated below 'F2', then the process can reset the active flag on segment Z because segment Z is below F2 to obtain the result in table 3.

TABLE 3

| SEGMENT | F2 | F3 | F4 | Active |
|---|---|---|---|---|
| W | A | A | B | N |
| X | A | B | B | Y |
| Y | A | B | A | Y |
| Z | B | B | A | N - reset by truncation |

In a last part of the building the segment table a value may be generated as to how far each segment is from an active segment. Later in the process, segments may be removed and cleaner results are obtained by removing segments which are farthest from the active areas first.

At this stage, there will be a table for each fault and each table will have a set of segments and their relationships to all other faults in the system and each segment will be marked as active or have a distance from an active segment. The segments can represent volumes that cross the fault and the process may now generate a list of volumes based on the faults 604. For example, W is in fact a volume which exists above F2, above F3 and below F4 as shown in FIG. 5. For this example, we know that that volume is in fact cut by the fault F1 and the process can generate Table 3 and add a set of volumes that exist by cutting each by F1. Table 4 shows all the volumes that touch F3 in the exemplary model shown in FIG. 5.

TABLE 4

| Volume | F1 | F2 | F3 | F4 |
|---|---|---|---|---|
| Wa | A | A | A | B |
| Wb | B | A | A | B |
| Xa | A | A | B | B |
| Xb | B | A | B | B |
| Ya | A | A | B | A |
| Yb | B | A | B | A |
| Za | A | B | B | A |
| Zb | B | B | B | A |

The same process may be carried out for each of the faults in the system. By removing duplicates, the process may obtain a list of all the volumes that exist in the system. The full list of volumes are in Table 5 and can be seen in FIG. 9A-9K. Specifically, FIG. 9A shows four faults (the regions that have a different grayscale) which have been truncated using truncation rules with seismic data in the background for context. FIG. 9B shows a single semi-transparent fault and the line in FIG. 9B is an intersection of the fault with the seismic data and shows how the seismic data is incoherent near the fault and why the system might need to use thick faults to exclude data near the faults. FIG. 9C shows the faults in FIG. 9A (in 3D) being used as barriers to the auto-tracking while FIG. 9D shows the same fault in a 2D cross section in which a fault 900 with a thickness (and a centerline) is used to define a region 902 (an exclusion area around the fault) that halts the horizon auto-tracking in order to prevent poor seimic data around a fault from being used as part of the horizon tracking.

Figure 9E:
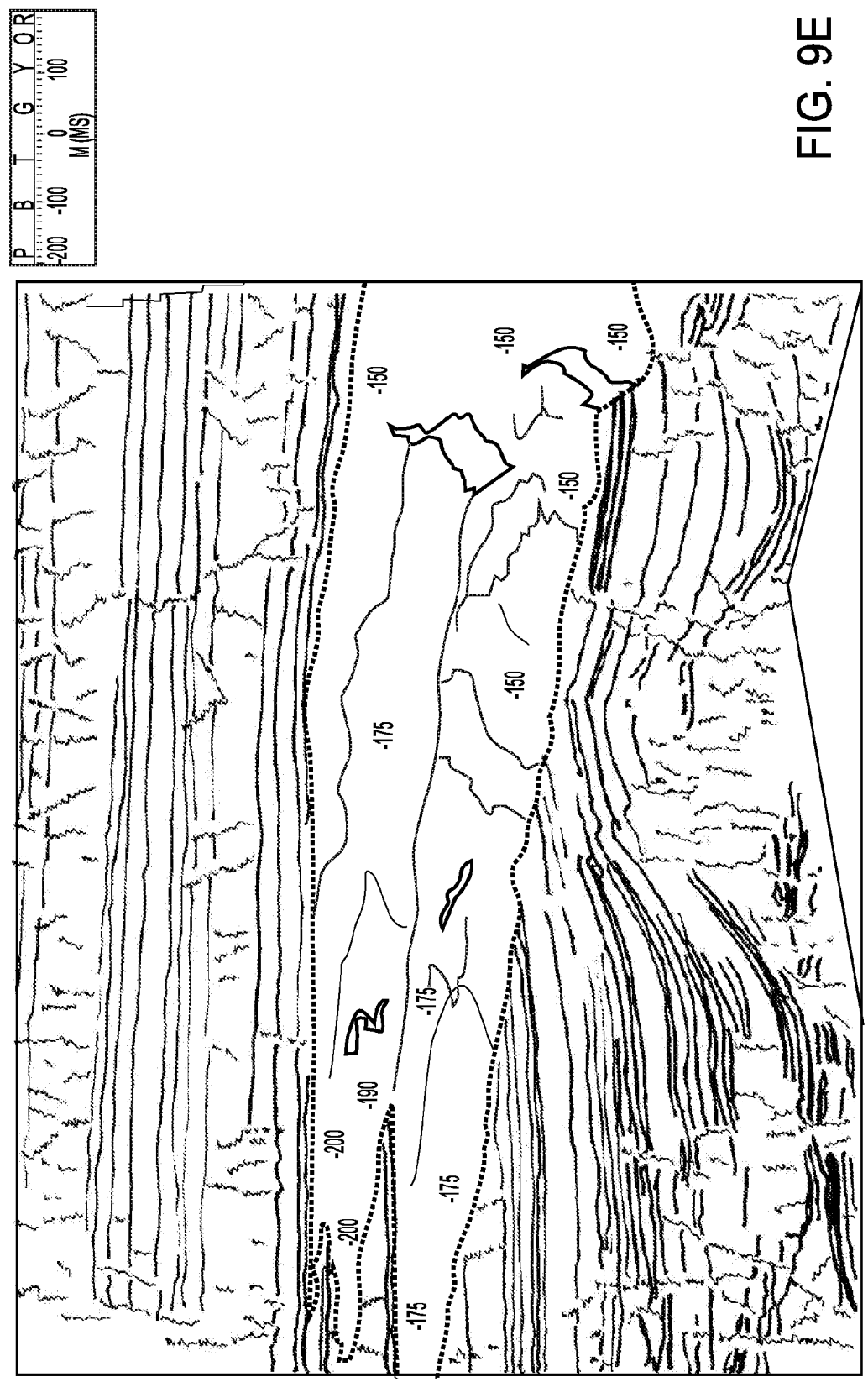
Figure 9F:
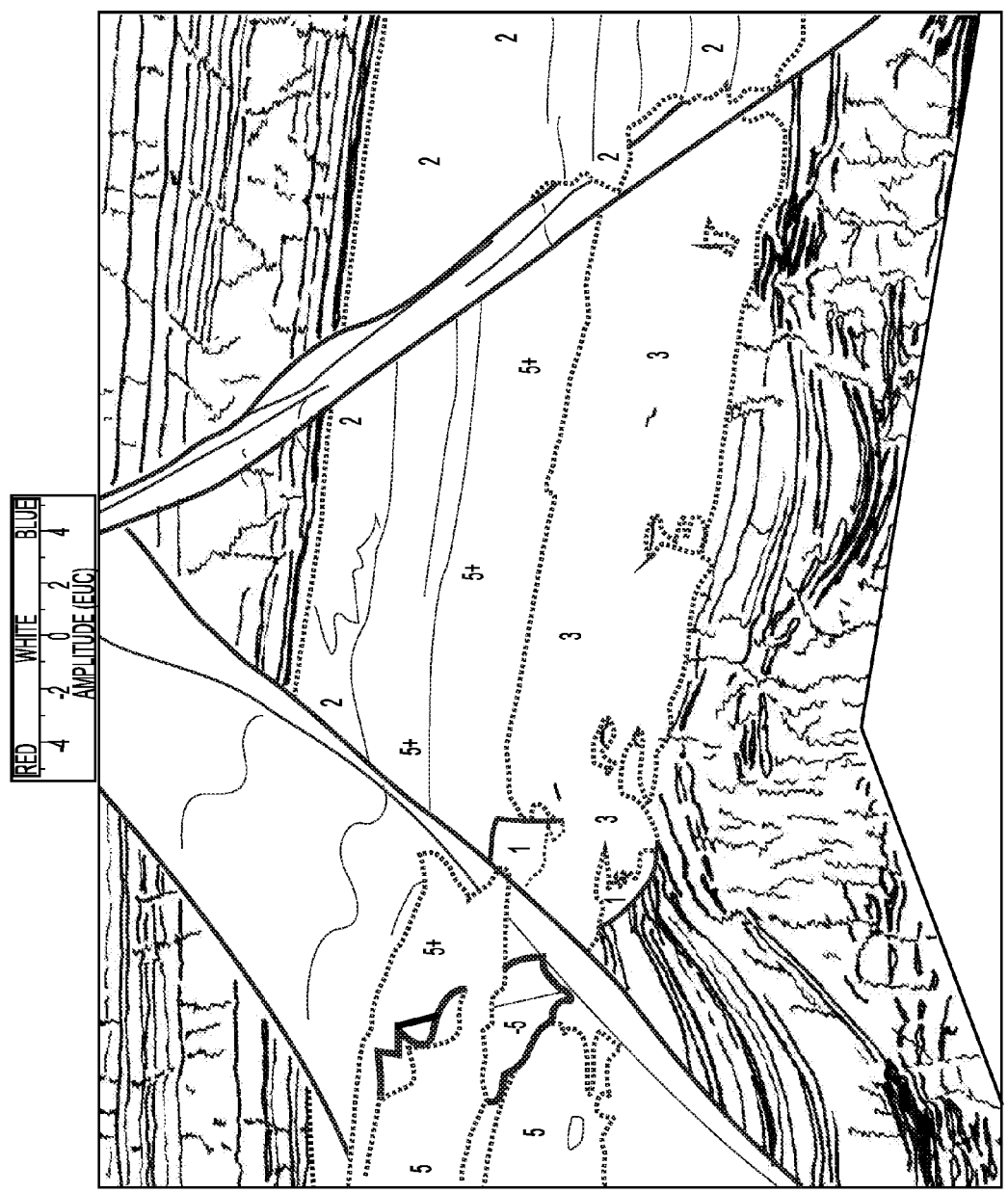
Figure 9G:
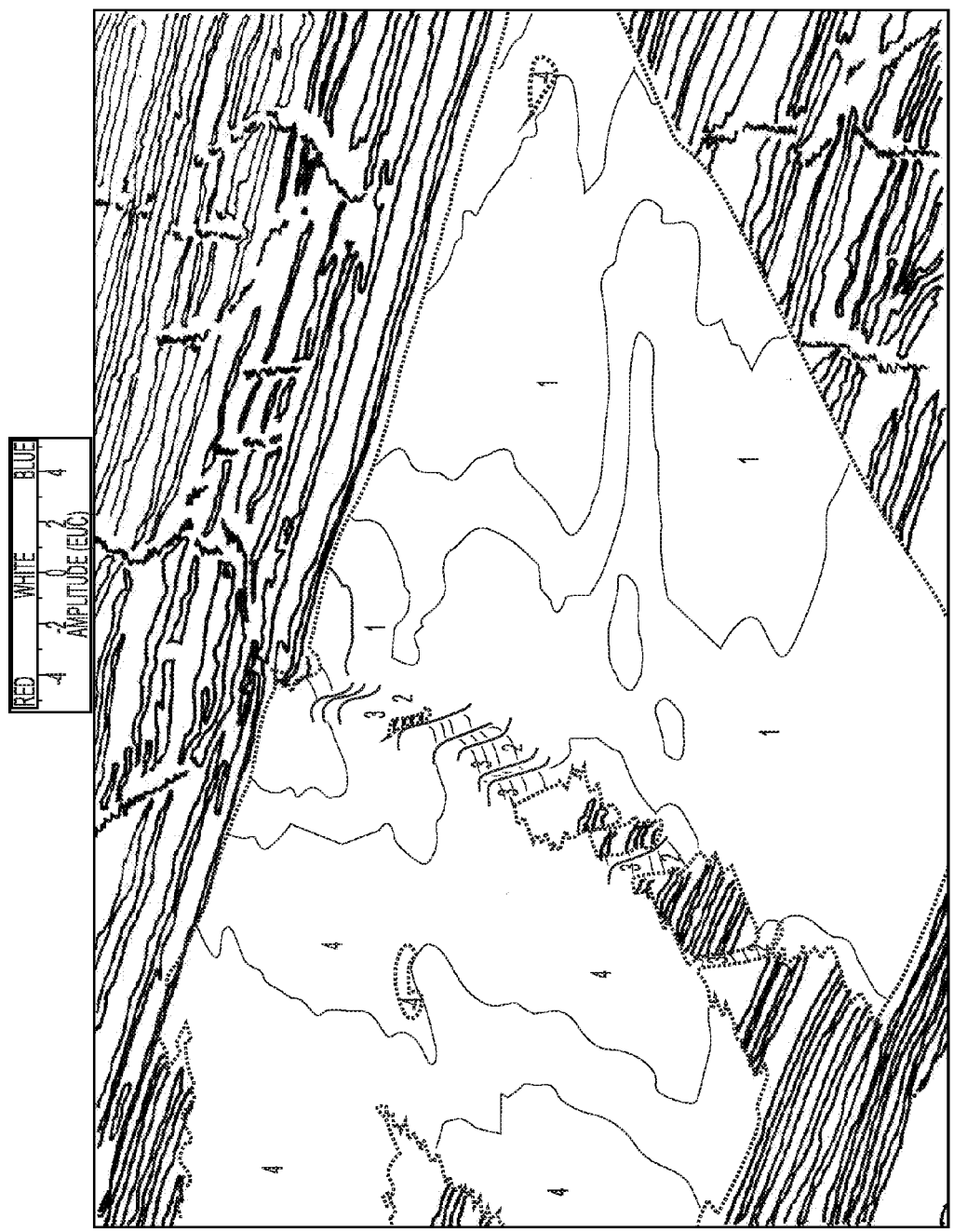
Figure 9H:
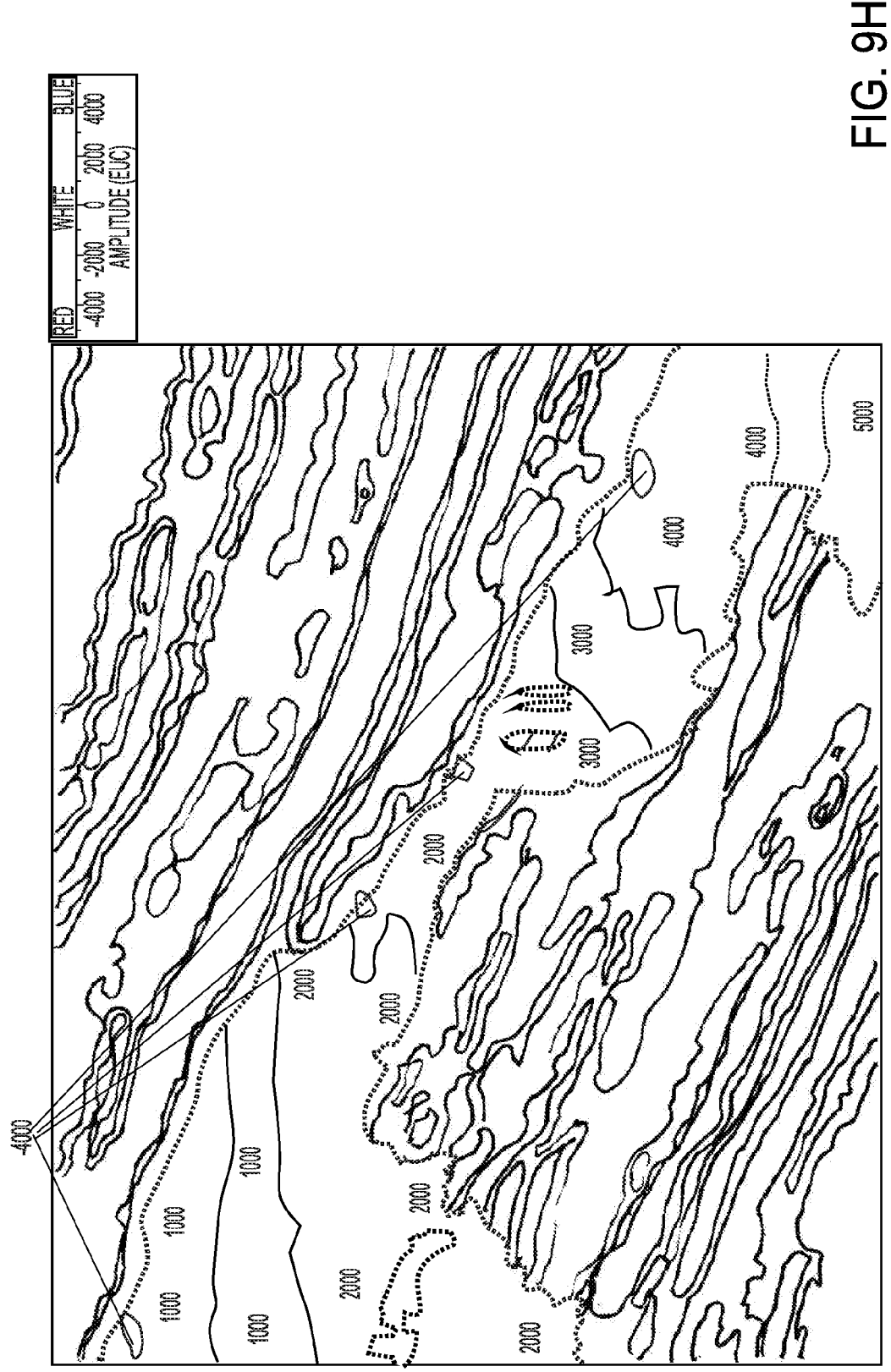
Figure 9I:
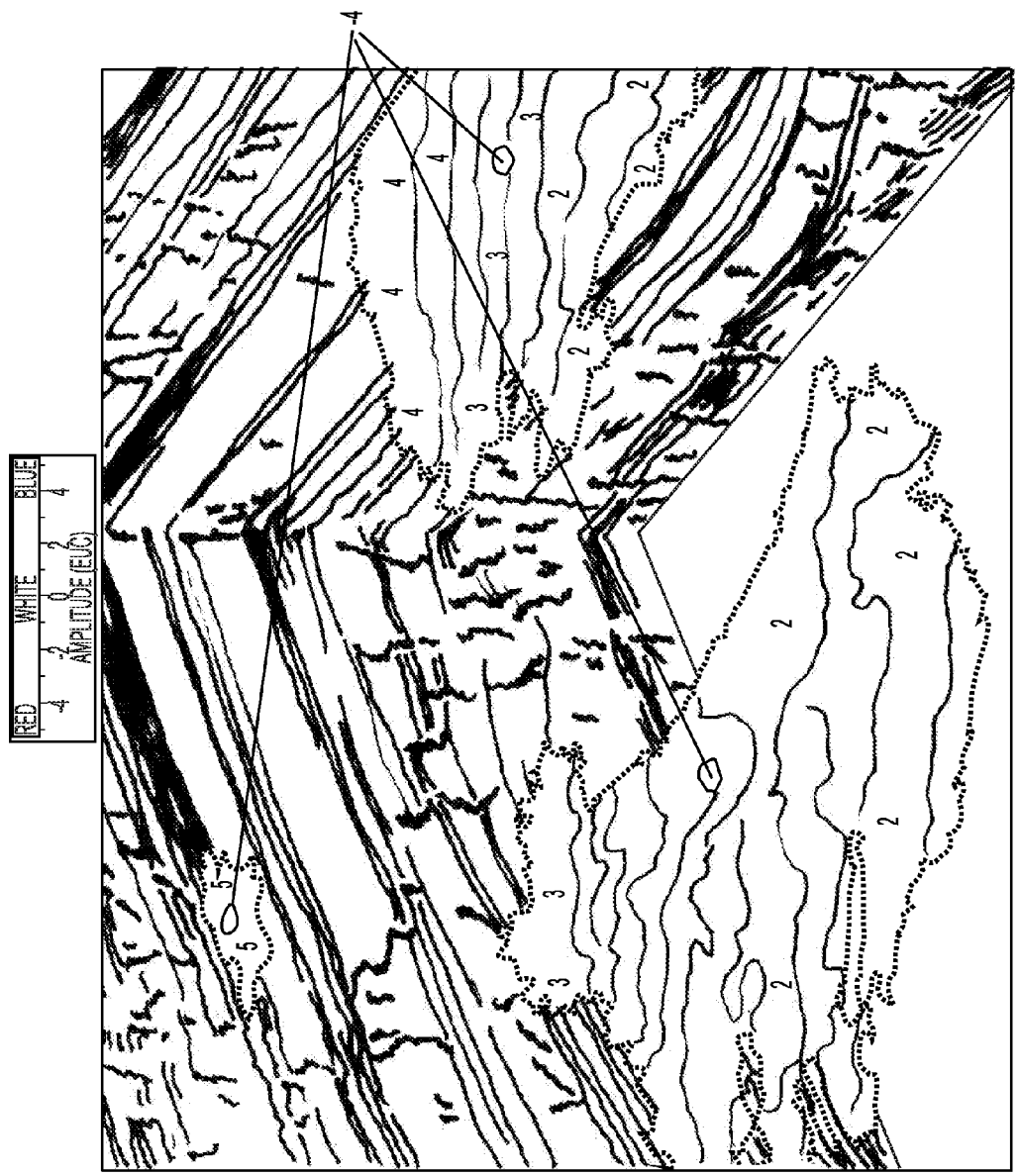
Figure 9J:
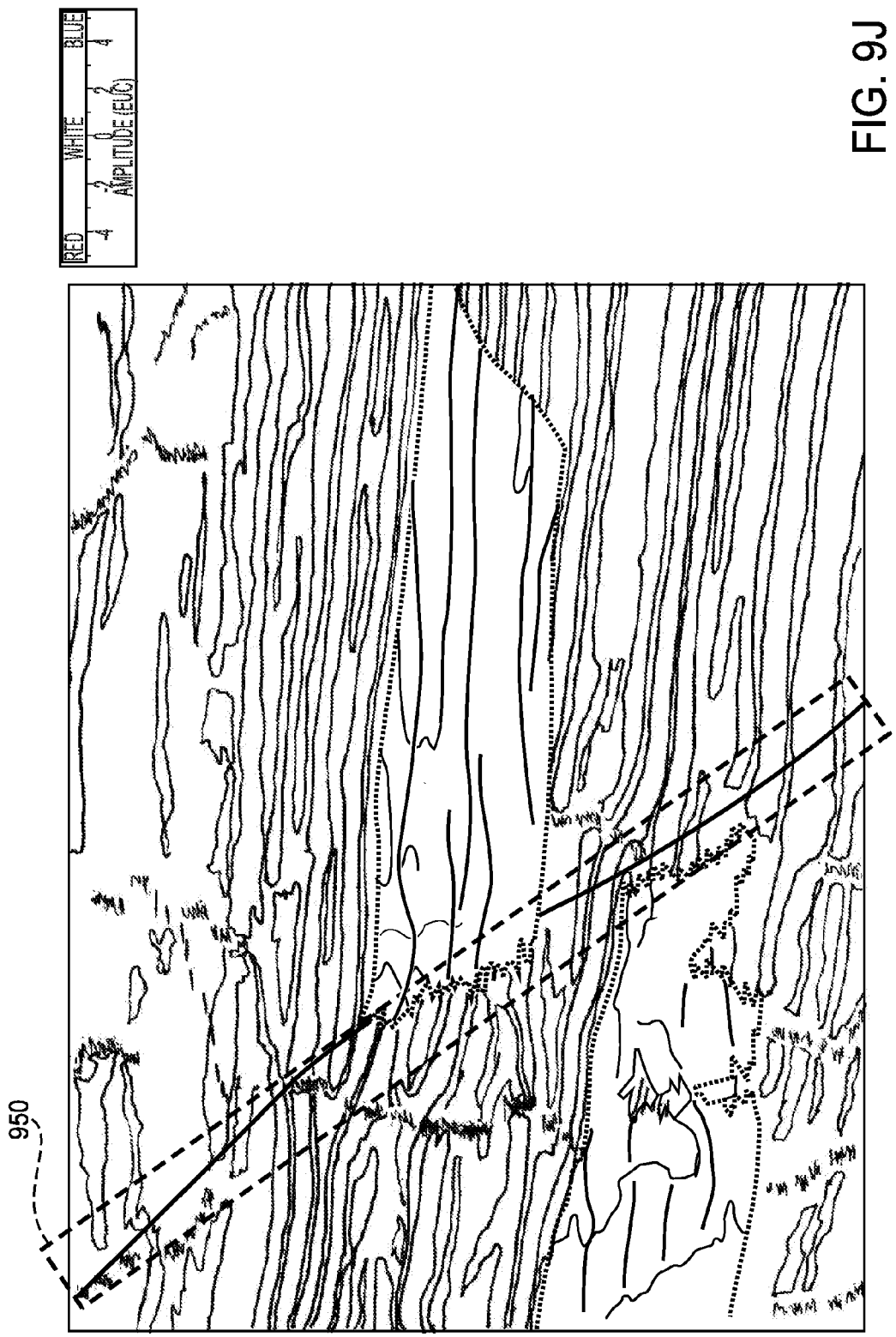
Figure 9K:
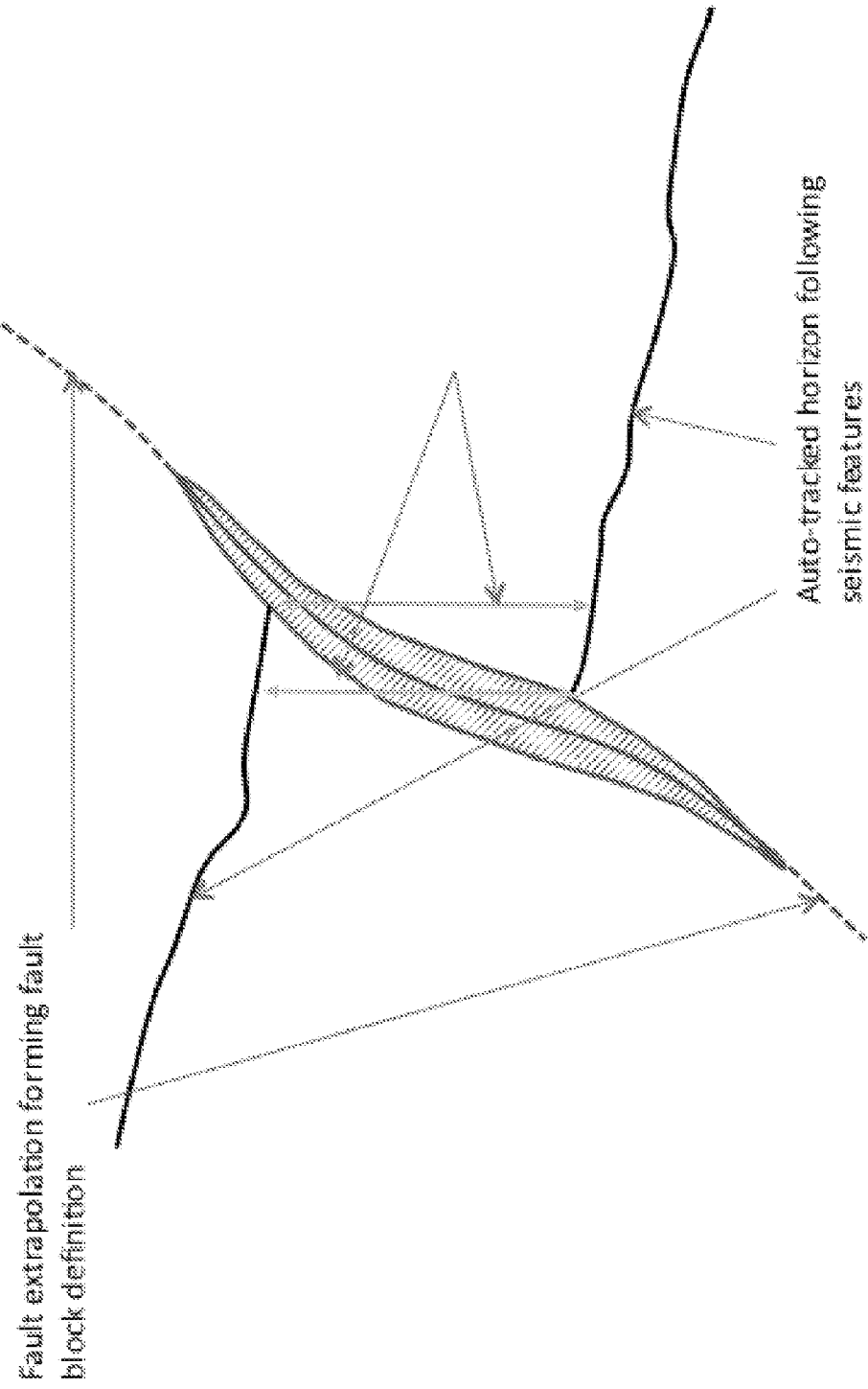

FIG. 9E shows an extrapolation of the auto-tracked horizons back to the faults to create a sealed model with clean fault polygons on the horizon and FIG. 9F shows faults with two horizons being interpreted. FIG. 9G shows two seeds controlling the auto-tracker on different sides of a fault in the seismic and the low correlation across the fault forms a natural joint between the regions generated by the seeds. FIG. 9H shows how seeds are used cause the process in FIG. 3 to follow the weaker branch of a bifrication in the seismic image, something that is typically very hard to do in other systems. FIG. 9I illustrates disjoint regions generated by 3 seeds. FIGS. 9J and 9K shown regions with repeated section (mult-z) separated by a modeled fault in 3D and 2D, respectively. The intersection of the center of the fault and seismic data is shown as the yellow line (surrounded by dotted box 950). Also note the two regions overlap one another as shown in FIG. 9K.

TABLE 5

| Volume | F1 | F2 | F3 | F4 |
|---|---|---|---|---|
| 1 | A | A | A | B |
| 2 | B | A | A | B |
| 3 | A | A | B | B |
| 4 | B | A | B | B |
| 5 | A | A | B | A |
| 6 | B | A | B | A |
| 7 | A | B | B | A |
| 8 | B | B | B | A |
| 9 | A | A | A | A |
| 10 | B | B | B | B |

In this process, each of the segments that have no active path of the fault are added to a list along with the distance from the active part of the fault and the two volumes that the segment is between. In the example being used, segments X & Y are not added and only segments from F1 are shown in this table (for simplicity) but in reality all segments would be added to this table.

TABLE 6

| Segment | Above Volume | Below Volume | Distance |
|---|---|---|---|
| W | 1 | 2 | 2.1 |
| Z | 7 | 8 | 1.3 |

In the process, the volumes in the list do not overlap and fill the region of space but they are much too complex. Thus the process may selectively merge segments together to form the simplest set of fault blocks (606) but also may not remove any segments which represent active parts of the fault. In this process, the segments may be sorted with any order being used. Based on test results, the best sorting results may be obtained by using distance to the active area as the sorting key, although other measures could be used. Then, the process may simplify the volume table using the following process (shown in pseudo code below):

```
for each segment {
    Get the table entry above and below the segment.
    Create a composite volume.
    Decide if it can be used.
    Replace the above & below with the composite.
}
```

Thus, the process may create a composite volume. In the example of segment 'W', the volumes in Table 5 may be:

| Segment | F1 | F2 | F3 | F4 |
|---|---|---|---|---|
| 1 | A | A | A | B |
| 2 | B | A | A | B |

The process may then form a composite volume which may be:

| Composite | S | A | A | B |
|---|---|---|---|---| where the symbol 'S' means that the volume span or crosses the fault. In this example, we can see that this composite no longer uses the segment 'W' to bound it.

The process may then decide if the composite can be used. The composite can only be used if all the current volumes are either completely outside or completely inside the composite. A volume may be completely inside if it matched values for anything which is not a span. For example, Composite S,A,A,B is completely inside of A,A,A,B. Similarly, a volume is completely outside if it's on the other side of any fault. For example, Composite S,A,A,B is completely outside of S,S,B,S.

If all volumes in the model are completely inside or outside this merge volume can be used to replace the original pair.

Figure 10A:
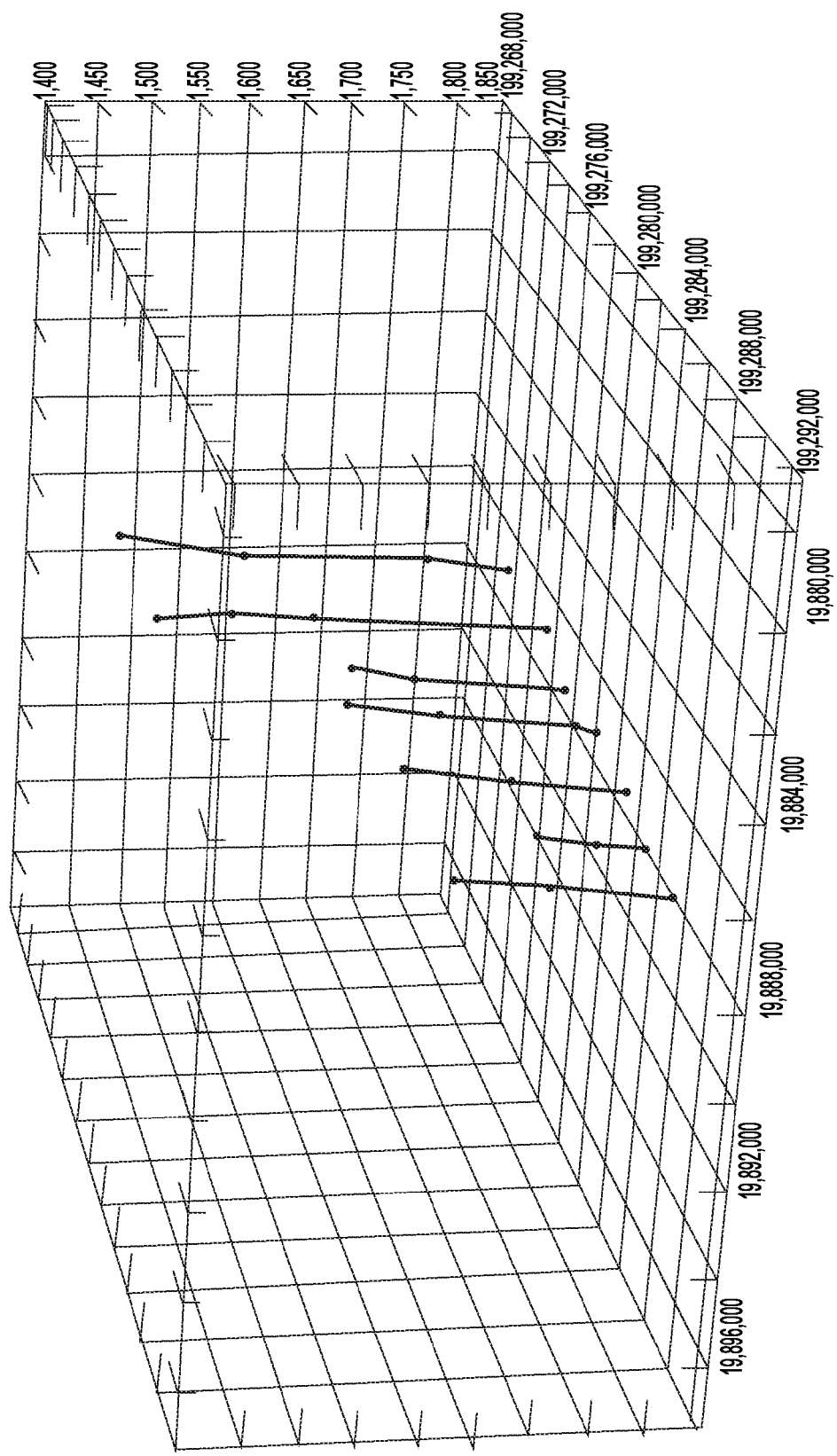
Figure 10B:
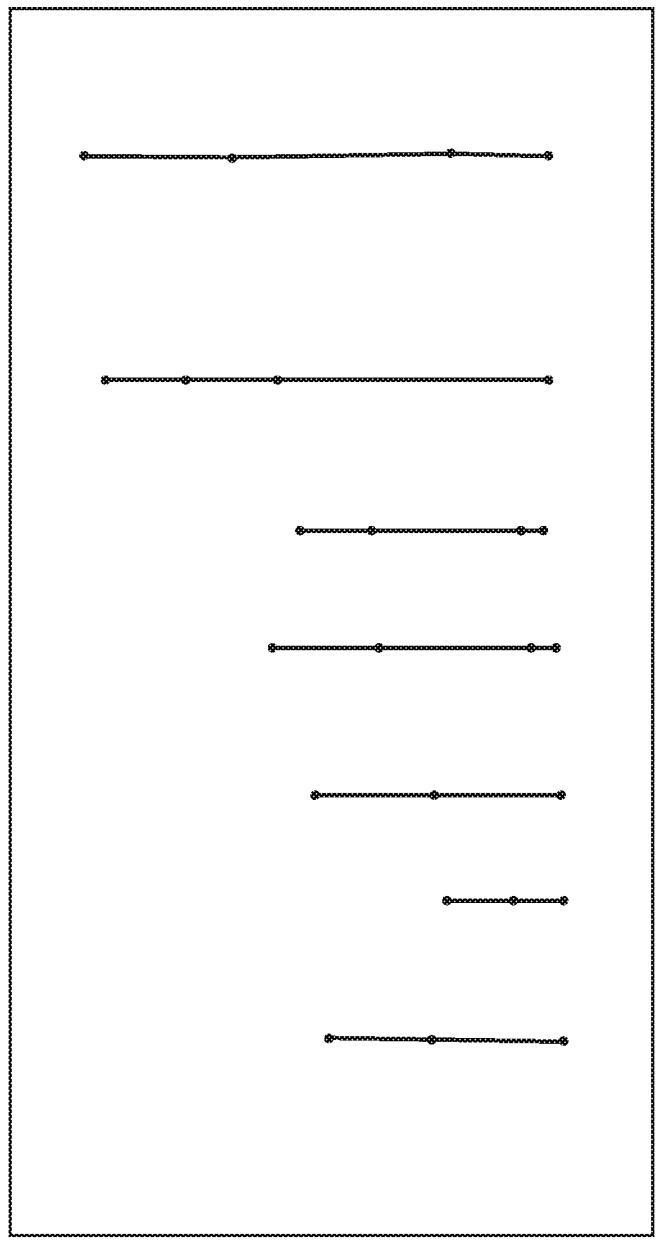
Figure 10D:
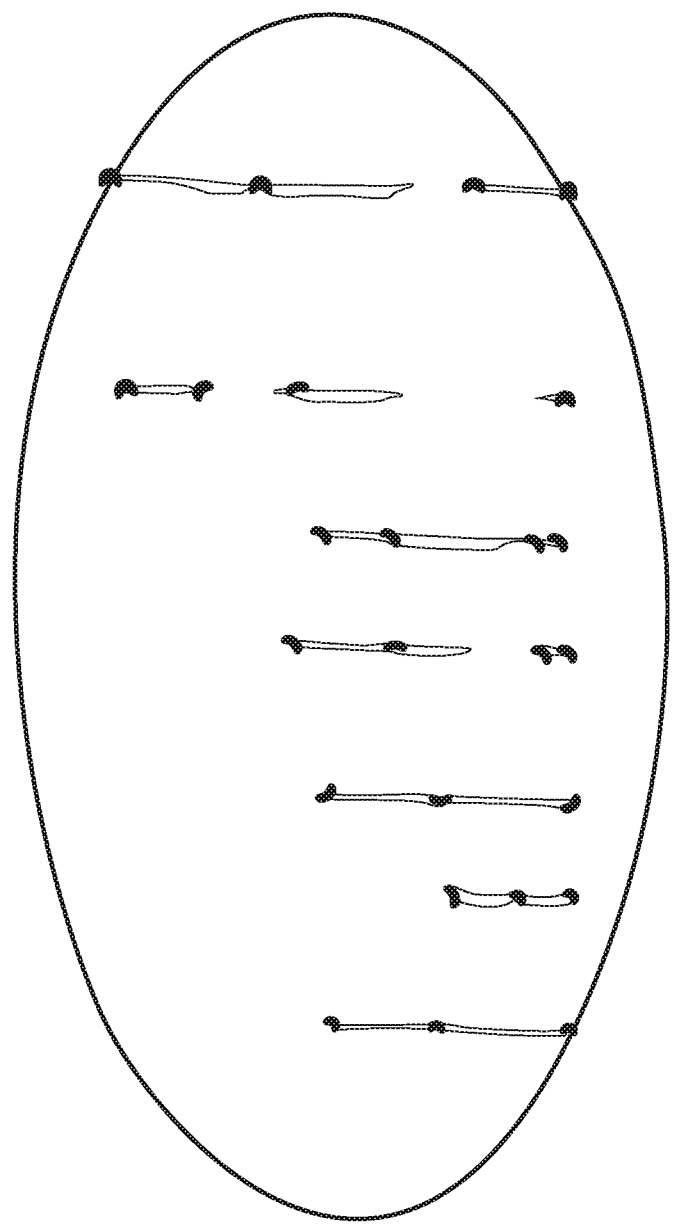
Figure 10E:
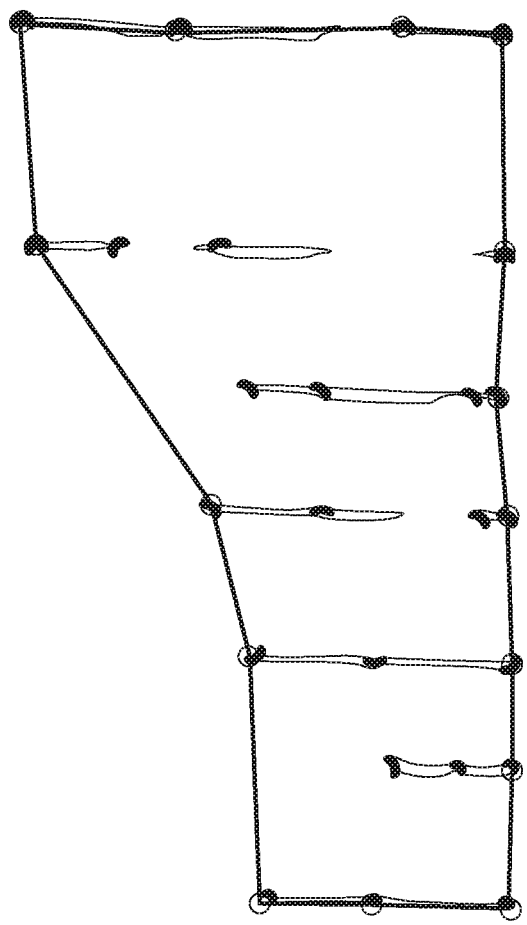
Figure 10F:
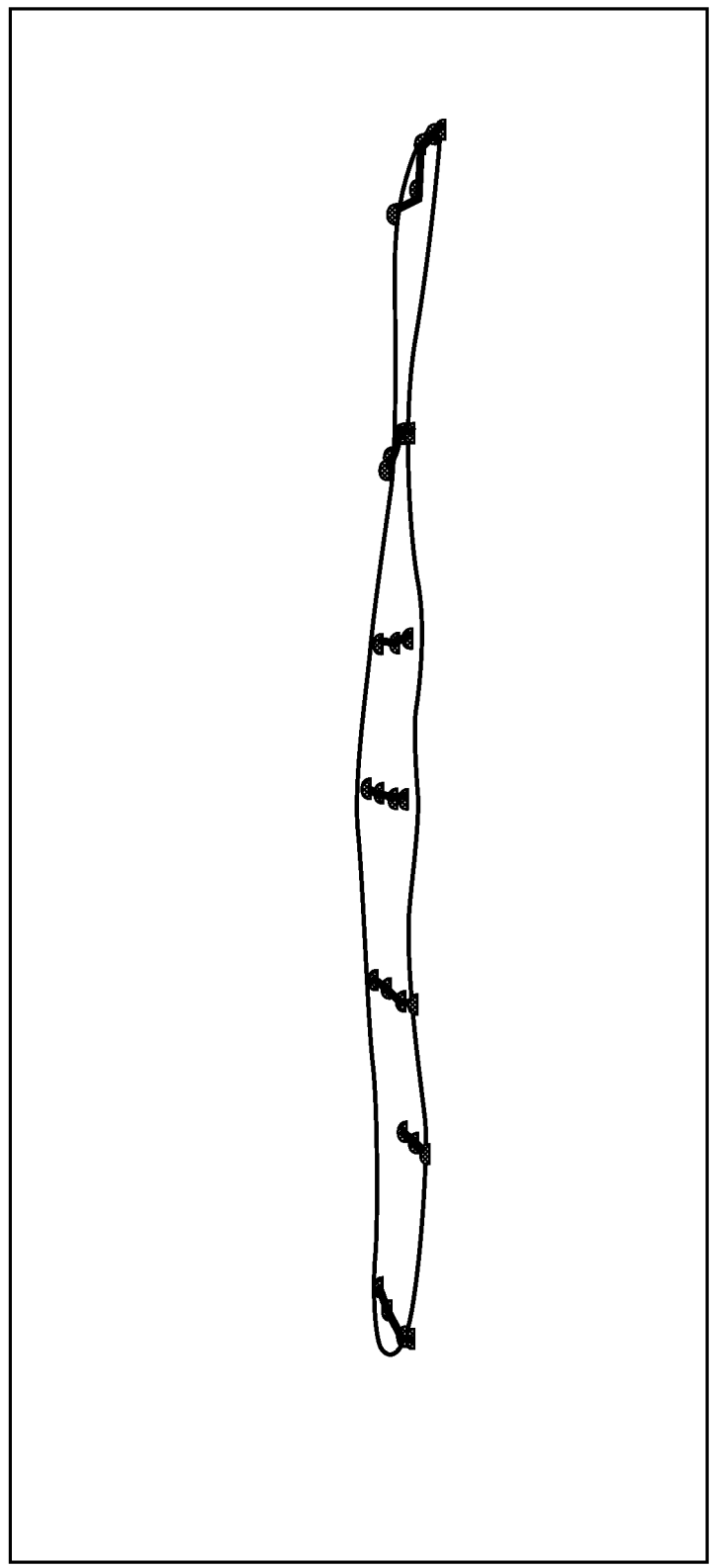
Figure 10G:
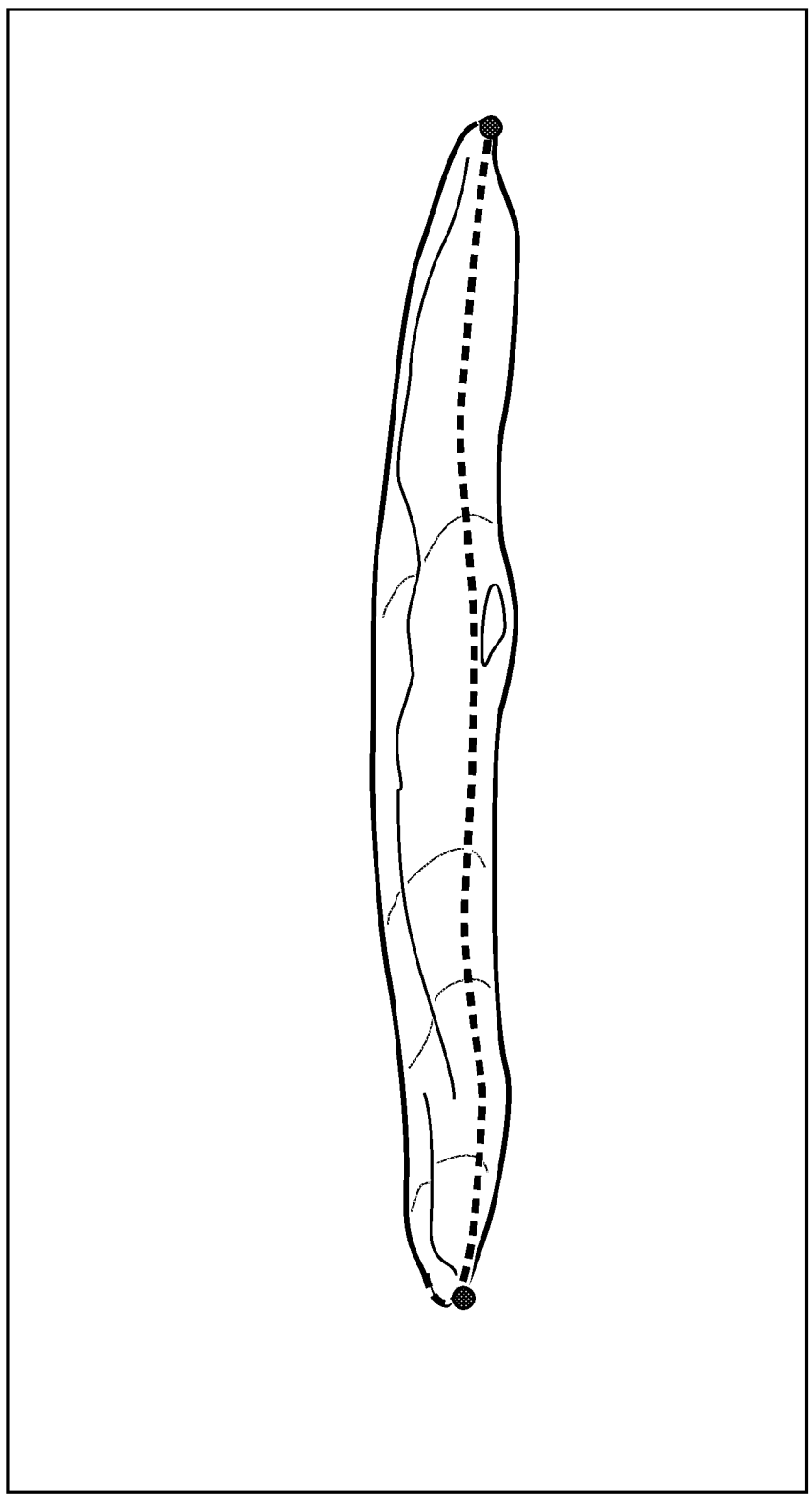
Figure 10H:
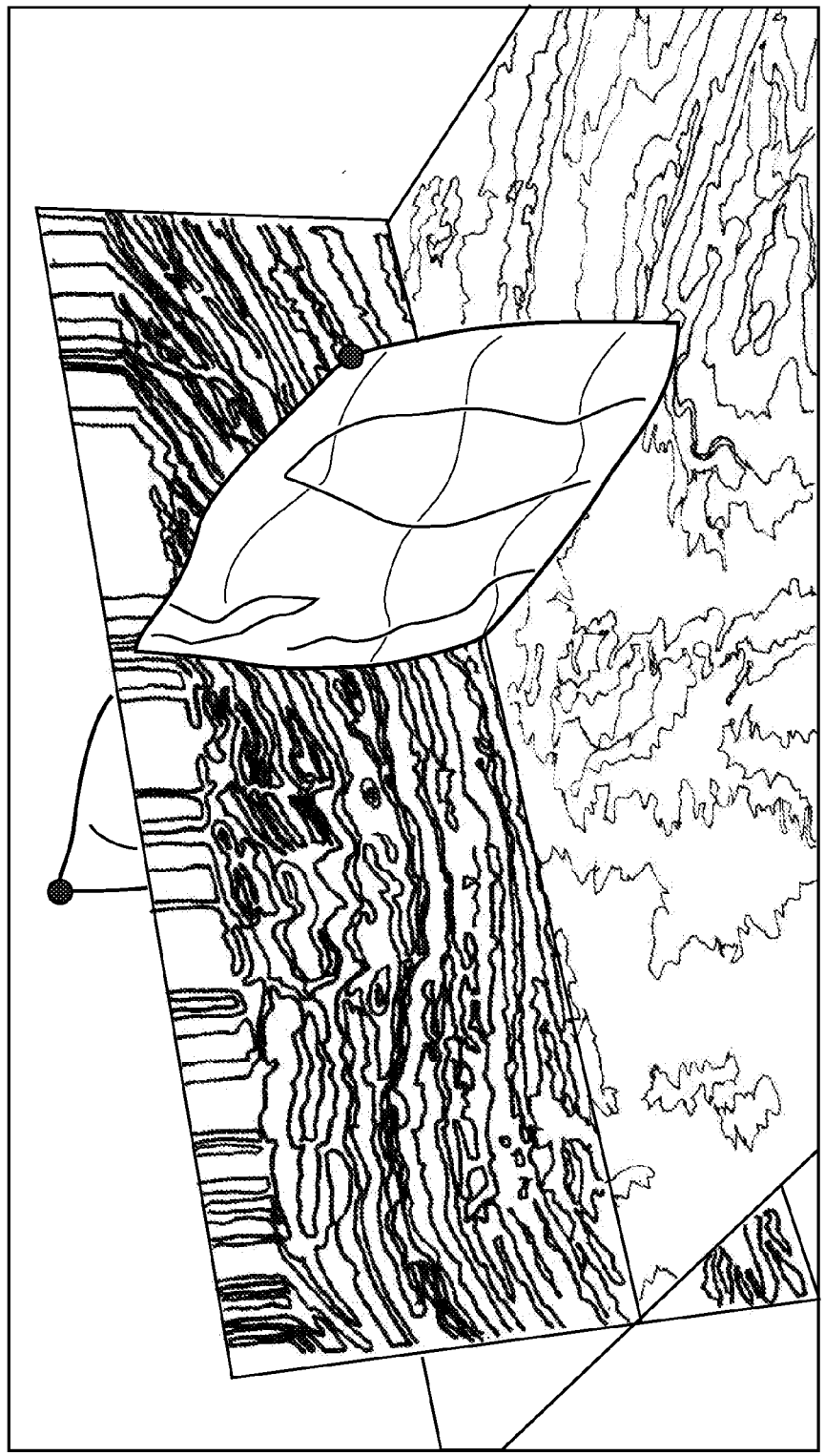

Once this process is complete, the fault blocks are reduced to a simple set. This can be seen in FIGS. 10A-H and Table 6. For example, FIG. 10A shows some fault sticks that may be input to the fault modeling process while FIG. 10B shows the fault sticks from a different viewing angle. FIGS. 10C1 and 10C2 show an extrapolated surface modeling the fault data in 3D and 2D, respectively. FIGS. 10D and 10E shows the same surface as in FIGS. 10C1, 10C2 trimmed rimmed with an eclipse to model the active area of the fault (FIG. 10D) or trimmed with an alpha shape to model the active area of the fault (FIG. 10E.) FIG. 10F shows the same fault on its side while FIG. 10G shows the fault with thickness enabled. FIG. 10H shows a fault with thickness in the context of some faulted seismic data.

TABLE 6

| SEGMENT | F1 | F2 | F3 | F4 |
|---|---|---|---|---|
| 1 | S | A | A | S |
| 2 | A | A | B | S |
| 3 | S | B | B | A |
| 4 | B | A | B | S |
| 5 | B | B | B | A |

Additional Implementation of the System and Method

The inputs to the system may be fault sticks or points interpreted on the fault. The process may model the fault surface. Each fault may be assumed to be roughly planes and a least square fit from the data to a plane is made and all processing is carried out in this plane. It is possible to model the fault from the 'z' direction, lower quality results will be obtained for near vertical faults. Further details may be found at http://en.wikipedia.org/wiki/Linear_regression which is incorporated herein by reference. Then all the input data (in real space, x,y,z) for the fault is then rotated into this plane so that x' & y' move along the plane and z' moves perpendicular to the plane. The data points on the fault may be then fitted using a spline fitting algorithm such as multi-level B-spline fitting. This will model the infinitely thin surface that represents the fault and this may be function: $S(x',y')$ Next, the shape of the fault may be modeled and faults are not infinite in their extent and may be considered as a bounded plane in space. This process may initially start with an elliptical fit. The process may then create a polygon around the edge of the fault and a convex hull or an alpha shape can be used to do this. Then, the generated polygon may be sub sampled along it's edges to create a set of 2d points bounding the fault and this set of points may be referred to as Bn. Then, an ellipse may be fitted to this data set to create an approximate model of the edge of the fault. For example, a least square fit may be used to create this and the result is in the form of $ax'^2+2bx'y'+cy'^2+2dx'+2fy'-1.0=0$. Further details may be found at http://mathworld.wolfram.com/Ellipse.html that is incorporated herein by reference.

In the method, the model of the thickness of the fault dies to zero at the edges of the fault. To accomplish this, a length of the maximum axis of the ellipse may be found and may be used to scale the thickness of the fault. By default, the maximum thickness of the fault may be set to 3% of this length but a user may edit this value subsequently. The equation $ax'^2+2bx'y'+cy'^2+2dx'+2fy'-1.0$ will equal $-1.0$ at the center of the ellipse. A first approximation to the fault thickness can be found by multiplying by a scaling factor, Scale, as follows: $E(x',y')=Scale*(ax'^2+2bx'y'+cy'^2+2dx'+2fy'-1.0).$ The process may then improve the shape of the fault. While the fault would be elliptical when viewed in the rotated modeling space, the process may create a thickness function that more closely matches the boundary polygon. To do so, using the points generated at the boundary, Bn, of the fault a thickness error En, may be calculated as follows:

$$En = -E(x',y') \text{ at every location in the point set } Bn$$

Then, using a spline fitting algorithm (multi-level B-spline), the point En may be turned into a correction function $C(x',y')$. Then, a final thickness of the fault may be created by correcting the ellipse so that it is zero along the boundary as follows: $T(x',y')=E(x',y')+C(x',y')$ Then, the user may adjust the fault between the shape of the fault between fitting the polygon and ellipse by adjusting a correction factor M between 0 & 1 as follows: $E(x',y')+M*C(x',y')$ so that the plane equation and the functions $S(x',y')$ and $T(x',y')$ define the fault.

Now, the fault may be used. In the method, if there is a point near by the fault and the user of the system wants to find the state of the fault nearby, $p[x,y,z]$, the following process may be followed. First, the point may be rotated into the modeling space, $p[x',y',z']$ and $p[x',y',S(x',y')]$ will be a nearby point on the fault surface. This result can be rotated back into real space to visualize the shape fault. An approximate distance from the fault, H may be calculated as: $S(x',y')-z'$ and $T(x',y')$ may be the thickness of the fault. If $T(x',y')<0$ the point is off the active part of the fault. Then, if $abs(T(x',y'))>abs(H)$ then the point is inside the fault. This is the key difference, the fault model has a volume.

Fault Thickness

Faults are normally represented as an infinitely thin model which represents a tear in the rock strata as shown in FIG. 9B. In many cases this is a highly simplified form of the reality of a fault. Depending on the rock type a fault can be comprised as a fractal system of smaller faults or in more malleable environments the fault has a region of folding near the actual fault. Even when clean faults exist the seismic imagining can cause artifacts around those fault which one would want to remove. The invention uses an envelope around the fault surface to model the volumetric region of the fault. This can be used exclude the complex zone of faulting or imagining artifacts and simplify subsequent processing.

Fault Block Formation

There are many situations where it is useful to compartmentalize a volume of space into regions separated by faults. Faults can form barriers so these compartments can be thought of as leaky containers for any fluids held in the geology. These contains are of vital importance in the study of oil and gas flow in a geologic reservoir. Any point in the model must be contained in one and only one fault block container as described above.

Complex Truncations

Faults tend to terminate on one another due to one fault reliving the stress of another fault. This situation is known as a fault truncation. The fault which absorbs the stress is known as the major fault and the fault which is terminated is known as the minor fault. Faults historically have their two sides labeled as a footwall and a hanging wall. Many geologic modeling systems define fault to fault truncations by rules such as fault 'A is truncated on the footwall of fault B'. In some situations these rules do not allow enough flexibility. The system may allow more complex situations to be modeled by the addition of a subdividing 3d plane into the rules.

The geologic situation where two faults curve around one another in a hand shake geometry is not uncommon. For example, if there are two faults, A & B in this configuration, at one end of the handshake A is major and B truncates against it but at the other end of the truncation B is major and A truncates against it so that one rule cannot be used to uniquely define the truncations between A and B. The system and method automatically identifies these situations and adds a 3d plane between the two ends of the handshake. For example, the rules may be:

A is truncated on the footwall of fault B above the 3d plane

B is truncated on the hanging wall of fault B below the 3d plane

Confidence for Auto-Tracking

This is an extension to auto-tracking described above to allow a user to control a surface more precisely. It is known to use cross correlation to calculate a quality value for each trace to trace jump. However, the system and method adds to this by keeping track of confidence at each pick. The confidence along a particular path from a seed point is calculated by multiplying the quality of each jump made along the path and only the highest confidence paths are kept.

This method provides three improvements over standard tracking methods:

1: Paths that cross a poor area of correlation are generally downgraded and tend to be overwhelmed by paths that don't. This leads to a tendency for a miss track to auto correct. In the standard method a miss track is perpetuated.

2: The confidence provides a natural value to terminate the tracking. The user can set a confidence level and create patches of auto-tracked data that the user as quality assured. The user can keep adding seeds to create interleaved patches until the desired effect is obtained. The patches will naturally be smaller in poor data and larger in good data providing a guild to where careful analysis should be performed. As shown in FIG. 9I.

3: The confidence value can be used to elegantly resolve conflict between paths from competing seed points. If paths from two seed points meet the highest confidence value will be used. This quality allows users to interpret features such as faults and bifurcations in an intuitive way by simply placing competing seed points on either side of the feature. This aspect is shown in FIGS. 9G and 9I. An example of this is also shown in FIG. 3B that was described above.

Dropping Seed Points on the Horizon

During the horizon tracking process described above, it is possible to drop seeds on to the existing auto-tracked horizon and thereby increase the confidence in this area and extend the patch. It is much quicker that referring back to the seismic and picking on the seismic data. This aspect is shown in FIG. 9G.

Combining a Volumetric Fault Block Model with Auto-Tracking to Allow Multi-z Interpretation In a typical auto-tracing method only allows one result per seismic trace and this creates a single valued surface which cannot overlap itself. In the horizon tracking system described above, the fault block model may be used to allow the tracker to create multiple results on a single trace creating a surface which can overlap itself. This is useful in reverse faulted environments. Faults are used to subdivide a region of space into a set of fault blocks. The tracker is allowed to create results which are single valued within each fault block. Where faults die out the tracker is allowed to pass from fault block to another, the walls of the fault block become transparent. This allows the tracker to pass around the edges of the defined fault.

Combining a Fault Model with Auto-Tracking to Consistent Filtering on Multiple Horizons Much time is spent on interpreting both horizons and faults. Often the results are not consistent with one another. Changes in throw on a horizon do not match the location of the fault. Fault polygons drawn on each horizon do not form into a sensible 3d network of faults. In the horizon tracking system, a 3d network of truncated faults is first created over a region of interest. Multiple horizons can be tracked all using the 3d network of faults as barriers to the tracking. The thickness of the 3d fault network is used to exclude a poor data very close to the fault. These tools ensure that both the throw of the horizon matches the fault network and that the faulting from horizon to horizon make sense in 3d. It also saves time, the fault network can be used to filter multiple horizons.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A seismic horizon extracting system, comprising:
a store that stores a set of seismic data;
a horizon tracking component, coupled to the store, that sets one or more parameters to track a horizon based on the seismic data and propagates a horizon based on the seismic data to track the horizon using a monotonic function to control a path process that propagates the horizon, wherein the monotonic function is a confidence of each seed point along a path generated from the seismic data.

2. The system of claim 1 further comprising a fault block analyzer component coupled to the horizon tracking component that performs fault block analysis on the seismic data to generate fault block data and the horizon tracking component propagates the horizon based on the seismic data and the fault block data to create multi-valued horizons.

3. The system of claim 1, wherein the fault block analyzer component sets the confidence along a block-bounding fault to zero to prevent the horizon from propagating across the fault.

4. The system of claim 1, wherein the confidence is: $C_i = C_{i-1} x_{i,i-1}$, where i indicates a point on a surface, i−1 indicates the point's antecedent during horizon extraction, and $x_{i,i-1}$ is the maximum of the normalized cross-correlation of windows of the seismic traces at locations i and i−1, and zero.

5. The system of claim 1, wherein the path process is one of a shortest path process, a distance transform process and an eikonal solver process.

6. The system of claim 1, wherein the horizon tracking component accepts a modification of the confidence of a point on a horizon to modify an extracted horizon.

7. The system of claim 6, wherein the horizon tracking component repropagates the horizon using the modified confidence of a point on the extracted horizon.

8. The system of claim 1, wherein the horizon tracking component further comprises a plurality of lines of computer code executed by a processor of a computer system.

9. The system of claim 8, wherein the fault block analyzer component further comprises a plurality of lines of computer code executed by a processor of a computer system.

10. The system of claim 9 further comprising a computer system having at least one processor and memory, wherein the horizon tracking component and the fault block analyzer component are stored in the memory and executed by the at least one processor.

11. A seismic horizon extracting method, comprising:
receiving seismic data;
setting one or more parameters to track a horizon based on the seismic data;
propagating a horizon based on the seismic data to track the horizon using a monotonic function to control a path process that propagates the horizon, wherein the monotonic function is a confidence of each seed point along a path generated from the seismic data.

12. The method of claim 11 further comprising performing fault block analysis on the seismic data to generate fault block data and propagating the horizon based on the seismic data and the fault block data to create multi-valued horizons.

13. The method of claim 12, wherein the monotonic function is a confidence of each seed point along a path generated from the seismic data.

14. The method of claim 13, wherein performing fault block analysis further comprising setting the confidence along a block-bounding fault to zero to prevent the horizon from propagating across the fault.

15. The method of claim 11, wherein the confidence is: $C_i = C_{i-1} x_{i,i-1}$, where i indicates a point on a surface, i−1 indicates the point's antecedent during horizon extraction, and $x_{i,i-1}$ is the maximum of the normalized cross-correlation of windows of the seismic traces at locations i and i−1, and zero.

16. The method of claim 11, wherein the path process is one of a shortest path process, a distance transform process and an eikonal solver process.

17. The method of claim 11 further comprising modifying the confidence of a point on a horizon to modify an extracted horizon.

18. The method of claim 17 further comprising repropagating the horizon using the modified confidence of a point on the extracted horizon.

* * * * *